(12) United States Patent
Al-Saggaf et al.

(10) Patent No.: US 11,215,977 B1
(45) Date of Patent: Jan. 4, 2022

(54) METHOD OF LINEAR ACTIVE DISTURBANCE REJECTION CONTROL FOR FRACTIONAL ORDER SYSTEMS

(71) Applicant: King Abdulaziz University, Jeddah (SA)

(72) Inventors: Ubaid M. Al-Saggaf, Jeddah (SA); Abdulrahman U. Alsaggaf, Jeddah (SA); Muhammad Moinuddin, Jeddah (SA); Maamar Bettayeb, Sharjah (AE); Rachid Mansouri, Tizi Ouzou (DZ)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/347,689

(22) Filed: Jun. 15, 2021

(51) Int. Cl.
*G05B 13/04* (2006.01)
*G05B 19/418* (2006.01)

(52) U.S. Cl.
CPC ..... *G05B 19/41885* (2013.01); *G05B 13/045* (2013.01); *G05B 2219/43188* (2013.01)

(58) Field of Classification Search
None
See application file for complete search history.

(56) References Cited

U.S. PATENT DOCUMENTS

2009/0143871 A1 6/2009 Gao et al.
2012/0283850 A1 11/2012 Gao et al.
2021/0124315 A1* 4/2021 Luo .................. G05B 21/02

OTHER PUBLICATIONS

Ubaid M. Al-Saggaf, et al., "Robustness Improvement of the Fractional Order LADRC Scheme for Integer High Order System", IEEE Transactions on Industrial Electronics, Aug. 18, 2020, 10 pages.
Dazi Li, et al., "Fractional active disturbance rejection control", ISA Transactions, vol. 62, Feb. 28, 2016, pp. 109-119.

\* cited by examiner

*Primary Examiner* — Sean Shechtman
(74) *Attorney, Agent, or Firm* — Oblon, McClelland, Maier & Neustadt, L.L.P.

(57) ABSTRACT

A fractional order Linear Active Disturbance Rejection Control (FOLADRC) system and a method thereof is disclosed. The FOLADRC system includes a fractional order state extended observer (FESO) controller circuit having a FESO controller. The FESO controller receives a process variable and plant output signal, estimates an input disturbance and an output disturbance and outputs disturbance cancelling feedback signals. The disturbance cancelling feedback signals are transmitted to multipliers present in a forward path of the FESO controller circuit. Further, the FESO controller has an observer gain vector and a cross over frequency bandwidth. The FESO controller incrementally changes the observer gain vector and the FESO controller bandwidth until a closed loop transfer function of the FESO controller converges, thus exhibiting an iso-damping property.

20 Claims, 18 Drawing Sheets

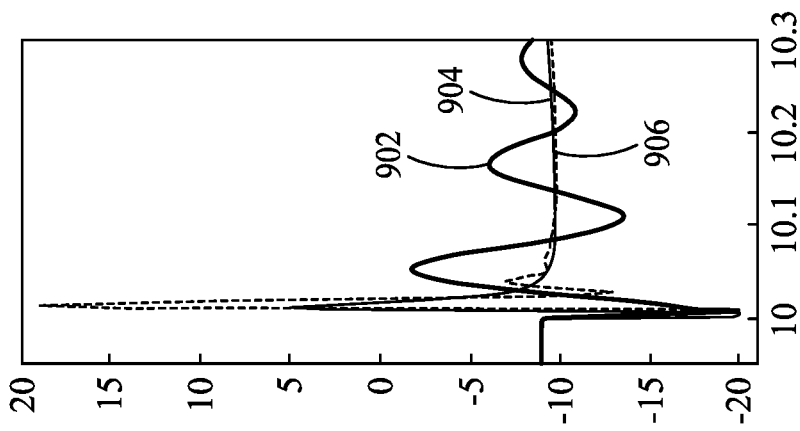
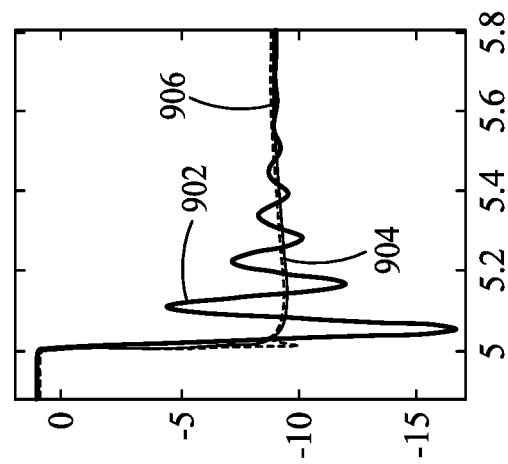
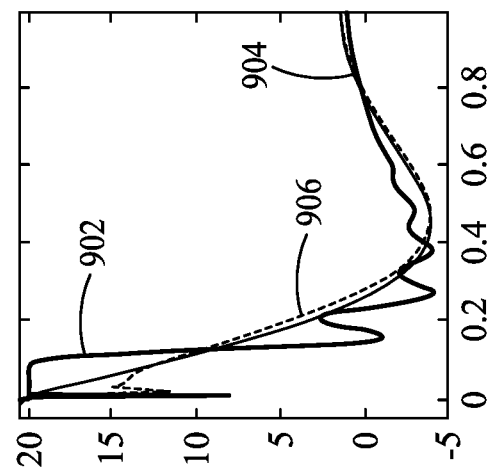
FIG. 9B
FIG. 9C
FIG. 9D

METHOD OF LINEAR ACTIVE DISTURBANCE REJECTION CONTROL FOR FRACTIONAL ORDER SYSTEMS

BACKGROUND

Technical Field

The present disclosure is directed towards a controller, system and method of fractional order Linear Active Disturbance Rejection Control (FOLADRC).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Active Disturbance Rejection Control (ADRC) is a controller design to control systems with uncertainties. The ADRC is a model free control process to treat both unknown unmodeled dynamics, also called internal disturbances, and external perturbations as a total disturbance, and to reject internal and total disturbances actively.

State-of-art design methods, namely, a fractional-order dynamics rejection process (FODRS) and a fractional linear active disturbance rejection control (FLADRC) seek to address these disturbances. In FODRS, a fractional model is transformed to an integer order model, and fractional-order dynamics are included into the generalized disturbance which is actively rejected. In FLADRC design, a standard LADRC process is generalized to a fractional order case. Further, a fractional order state extended observer (FESO) is introduced to the design to estimate successive fractional derivatives of an output with generalized disturbance.

ADRC processes take into account model uncertainties of a fractional order system but require a known model order of the system to be controlled. In another ADRC process, an integer order model of a plant to be controlled is transformed to a non-integer order. A commensurate FESO is used in the process to estimate generalized disturbance. A non-commensurate state feedback control is also used in the ARDC process to solve a conventional set-point tracking problem of a controller.

U.S. publication 2012/0283850 describes a parameterized ADRC controller applied to a second-order plant. U.S. publication 2009/0143871 describes controller scaling and parameterization of an ADRC controller. Both of these publications describe an integer order control structure.

Further, a fractional active disturbance rejection control (FADRC) process has been applied to linear fractional order systems and uses a fractional-order extended observer (FESO) estimate disturbances. However, this reference assumes the system to be controlled is fractional. (See: Dazi Li et al., "Fractional active disturbance rejection control", ISA Trans. 2016 May; 62:109-19. doi: 10.1016/j.isatra.2016.01.022. Epub 2016 Feb. 28. PMID: 26928516, incorporated herein by reference in its entirety).

Each of the foresaid mentioned systems and methods suffers from one or more drawbacks hindering their adoption. Accordingly, it is an object of the present disclosure to alleviate above mentioned problems by building a robust control process having minimum control design parameters.

SUMMARY

In an exemplary embodiment, a fractional order linear active disturbance rejection control (LADRC) method is disclosed. The method includes receiving an input signal, r, by a plant process control circuit, multiplying the input signal, r, by a first gain ($K_c$) to generate a modified signal, $u_0$, dividing the modified signal, $u_0$ by a static gain, $b_0$, to generate a process variable, u, multiplying a first disturbance, $d_u$, to the process variable, u, at an input to a plant, multiplying a second disturbance $d_y$ to an output of the plant and generating a disturbed plant output, y. The method further includes feeding back the disturbed plant output, y, and the process variable, u, to a fractional order state extended observer (FESO) controller. The FESO controller has an observer gain vector (L) and a cross over frequency bandwidth, $\omega_c$. The FESO controller estimates the first and the second disturbance, generates a first disturbance cancelling feedback signal, $z_1$, and generates a second disturbance cancelling feedback signal, $z_3$. The method further includes combining the input signal, r, with the first disturbance canceling feedback signal, $z_1$, combining the modified signal, $u_0$, with the second disturbance cancelling feedback signal, $z_3$, and incrementally changing, by the FESO controller, the observer gain vector, L, and the FESO controller bandwidth, $\omega_c$, until a closed loop transfer function of the FESO controller converges.

In another exemplary embodiment, a fractional order state extended observer (FESO) controller circuit for closed loop plant control is disclosed. The FESO controller circuit includes of an input port configured to receive an input signal, r and an output port for generating an output signal, y. The FESO controller circuit further includes a first multiplier connected to the input port and a first amplifier, having a first gain $K_c$, connected to the first multiplier. The first amplifier is configured to output a modified signal $u_0$. The FESO controller circuit further includes a second multiplier connected to the first amplifier and a second amplifier, having a static gain $b_0^{-1}$, connected to the second multiplier. The second amplifier is configured to output a process variable, u. The FESO controller circuit further includes a third multiplier to receive the process variable, u and an input disturbance, $d_u$. A plant, which has a plant input and a plant output, is connected to the third multiplier. The FESO controller circuit further includes a fourth multiplier connected to the plant output where the fourth multiplier is configured to receive an output disturbance $d_y$, and combine a plant output signal by the output disturbance, $d_y$, to generate a disturbed output signal, y. The FESO controller circuit includes a fractional order state extended observer (FESO) controller that has a first FESO controller input, a second FESO controller input, a first FESO controller output and a second FESO controller output. The first FESO controller input is connected to receive the process variable, u and the second FESO controller input is connected to receive the plant output signal, y. The FESO controller has circuitry and a processor having program instructions configured to perform fractional order LADRC to estimate the input disturbance and the output disturbance, generate a first disturbance cancelling feedback signal, $z_1$, and generate a second disturbance cancelling feedback signal, $z_3$. The first disturbance cancelling feedback signal, $z_1$, is transmitted to the first multiplier and the second disturbance cancelling feedback signal, z3, is transmitted to the second multiplier.

The FESO controller has an observer gain vector (L) and a cross over frequency bandwidth, $\omega_c$, wherein the FESO controller is configured to incrementally change the observer gain vector, L, and the FESO controller bandwidth, $\omega_c$, until a closed loop transfer function of the FESO controller converges.

In another exemplary embodiment, a non-transitory computer readable medium has stored instructions when executed by one or more processors, causes the one or more processors to perform a method of a fractional order linear active disturbance rejection control (LADRC). The method includes receiving an input signal, r, by a plant process control circuit, multiplying the input signal, r by a first gain ($K_c$) to generate a modified signal, $u_0$, dividing the modified signal, $u_0$ by a static gain, $b_0$, to generate a process variable, u, multiplying a first disturbance, $d_u$, to the process variable, u, at an input to a plant, multiplying a second disturbance, $d_y$, to an output of the plant and generating a disturbed plant output, y. The method further includes feeding back the disturbed plant output, y, and the process variable, u, to a fractional order state extended observer (FESO) controller. The FESO controller has an observer gain vector (L) and a cross over frequency bandwidth, $\omega_c$, wherein the FESO controller estimates the first and the second disturbance, generates a first disturbance cancelling feedback signal, $z_1$, and generates a second disturbance cancelling feedback signal, $z_3$. The method further includes combining the input signal, r, by the first disturbance canceling feedback signal, $z_1$, combining the modified signal, $u_0$, by the second disturbance cancelling feedback signal, $z_3$ and incrementally changing, by the FESO controller, the observer gain vector, L, and the FESO controller bandwidth, $\omega_c$, until a closed loop transfer function of the FESO controller converges.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9B is an enlarged sub-plot indicating the control signal of the closed loop at t=0 s of FIG. 9A, according to exemplary aspects of the present disclosure;

FIG. 9C is an enlarged sub-plot indicating the control signal of the closed loop at t=5 s of FIG. 9A, according to exemplary aspects of the present disclosure;

FIG. 9D is an enlarged sub-plot indicating the control signal of the closed loop at t=10 s of FIG. 9A, according to exemplary aspects of the present disclosure;

DETAILED DESCRIPTION

Figure 1:
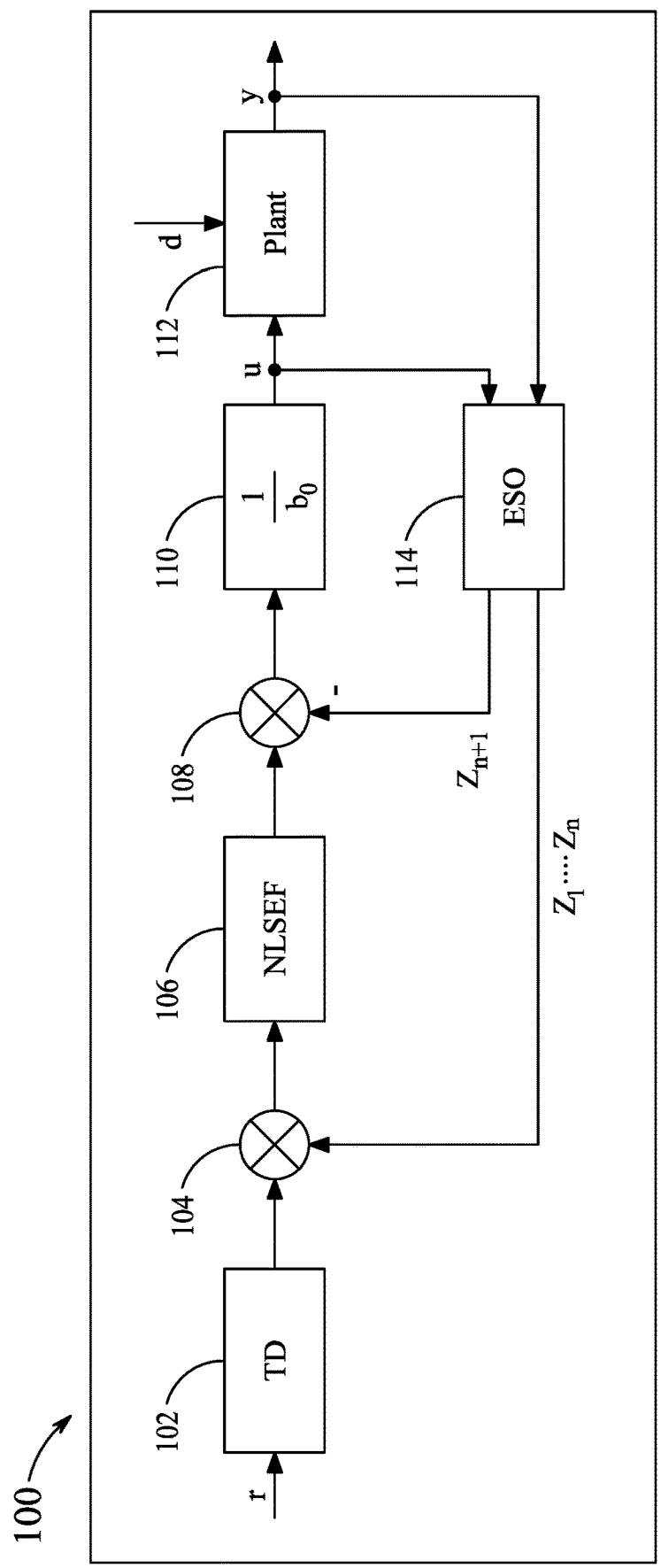
FIG. 1 is a schematic diagram of an ADRC system, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to methods and system for a fractional order linear active disturbance rejection control.

FIG. 1 to FIG. 5 depict conventional disturbance rejection control systems and are described to show the state of the art and for comparison with the system of the present disclosure.

FIG. 1 illustrates a conventional active disturbance rejection control (ADRC) system 100. The ADRC system 100 comprises of a tracking differentiator (TD) 102, a non-linear state error feedback (NLSEF) 106, an amplifier 110, a plant 112 to be controlled, and an extended state observer (ESO) 114. The ADRC system 100 further comprises a multiplier 104, and a multiplier 108 in a forward path of a closed loop of ADRC system. In an aspect, the ADRC system 100 is configured to consider all unknowns in a controlled process, such as, an unknown process model and disturbances termed as "generalized disturbances," and to design a controller to reject the generalized disturbances. The TD 102 is a non-linear dynamic device that extracts first to high-order differential signals of an input signal. The TD 102 may provide a transient process and its derivative of the input signal. NLSEF 106 is configured to provide a control signal based on an estimated output, a reference signal and their respective derivatives. The amplifier 110 is a component having a gain $(1/b_0)$ configured to amplify the input signal. The plant 112 may be a circuitry, machinery or a system experiencing "disturbances" that are to be controlled. The ESO 114 is a component configured to estimate the states including a total disturbance, f(t) on the plant 112.

In operation, an input signal, r, is input to the TD 102. The TD 102 extracts first to high-order differential signals of the input signal, r. The NLSEF 106 receives a processed signal from the TD 102 through the multiplier 104. The multiplier 104 may also receive a feedback input from ESO 114. The amplifier 110 with an amplifier gain $(1/b_0)$ amplifies a resultant signal obtained from the NLSEF 106 and the ESO 114. The ESO 114 estimates observer states ($z_1 \ldots z_n$) and disturbance, d from output, y. The ESO 114 provides the observer states as a reference signal ($z_1 \ldots z_n$) to the multiplier 104 and a reference signal $z_{n+1}$ to the multiplier 108. Based on the estimated output y, the reference signal and their respective derivatives, the NLSEF 106 is applied to combine the estimated output y, the reference signal and their respective derivatives to obtain the control signal, u. The ADRC system 100, however, requires a known model order of a plant 112 to be controlled.

Figure 2:
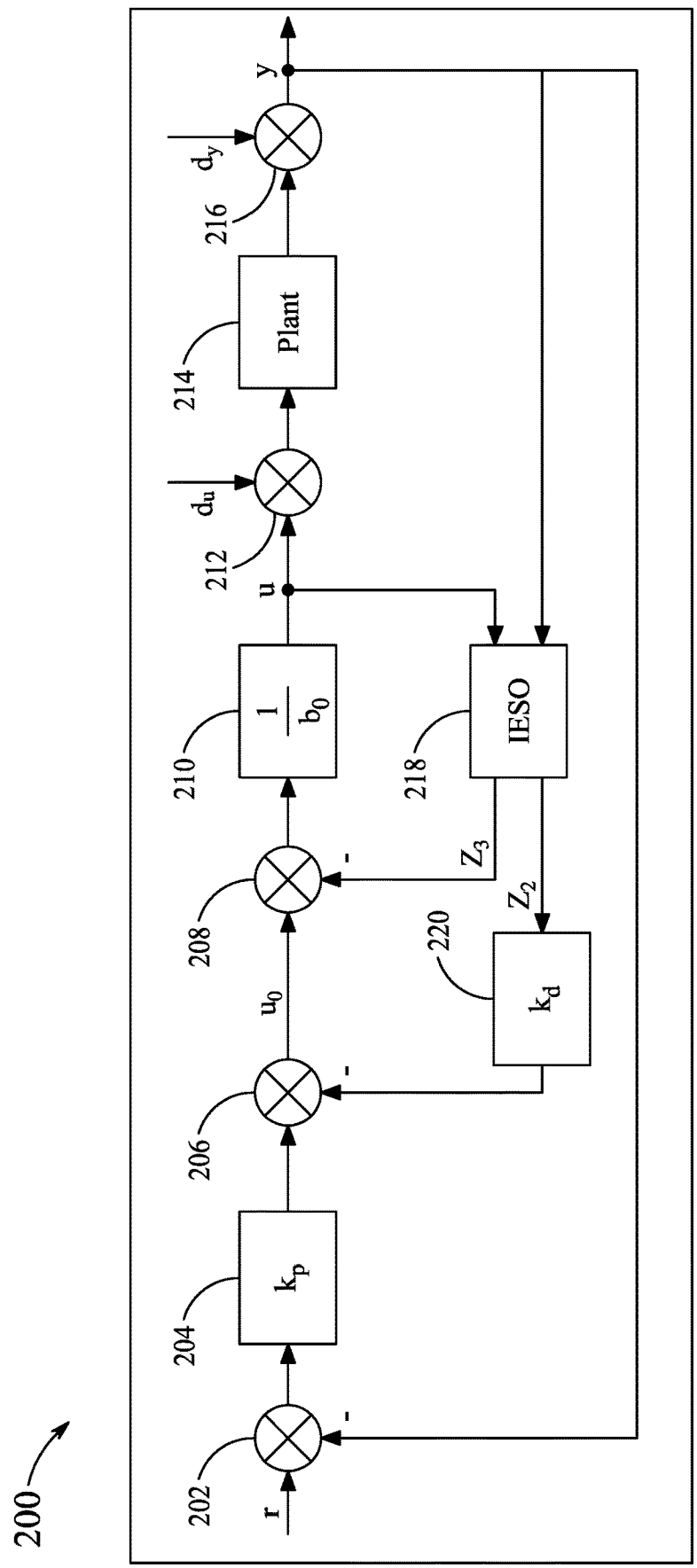
FIG. 2 is a schematic diagram of an FODRS system, according to exemplary aspects of the present disclosure.

FIG. 2 illustrates a conventional FODRS system 200. The FODRS system 200 comprises a plant 214 to be controlled, an amplifier 204 with a gain, $k_p$, an amplifier 210 having a gain, $1/b_0$, and an amplifier 220 with gain, $k_d$. The FODRS system 200 also comprises a multiplier 202, a multiplier 206, a multiplier 208, a multiplier 212 and a multiplier 216 in a forward path of closed loop of FODRS system 200, and an integer-order extended state observer (IESO) 218.

In the FODRS system 200, an input signal, r, is input to the amplifier 204 with gain $k_p$ through the multiplier 202. The amplifier 204 amplifies the input signal, r, based on the amplifier gain, $k_p$. The amplifier 210 receives and further amplifies an amplified signal $u_0$ based on the amplifier gain $1/b_0$ to generate a signal, u. In some aspects, the amplified signal input may be combined to include reference signals from the IESO 218. An input signal to the plant 214, which is an output from the amplifier 210, is affected with an input disturbance, $d_u$, as illustrated as another input to the multiplier 212. The resultant signal is applied to the plant 214. The plant 214 generates an output signal, which is affected by an output disturbance, $d_y$, as illustrated by the multiplier 216 combining the output signal and the output disturbance, $d_y$. The output signal, y, and a signal, u, are input to the IESO 218. The IESO 209 estimates a generalized disturbance which is inclusive of external disturbances (that is, the input disturbance, $d_u$, and the output disturbance, $d_y$), unknown internal dynamics of the system 200 and uncertainty in the gain of the system 200. Such generalized disturbances, i.e., $z_2$ and $z_3$, are input to the multiplier 206 via the amplifier 220 with gain, $k_d$, and to the multiplier 208, respectively, to cancel the external disturbance.

Figure 3:
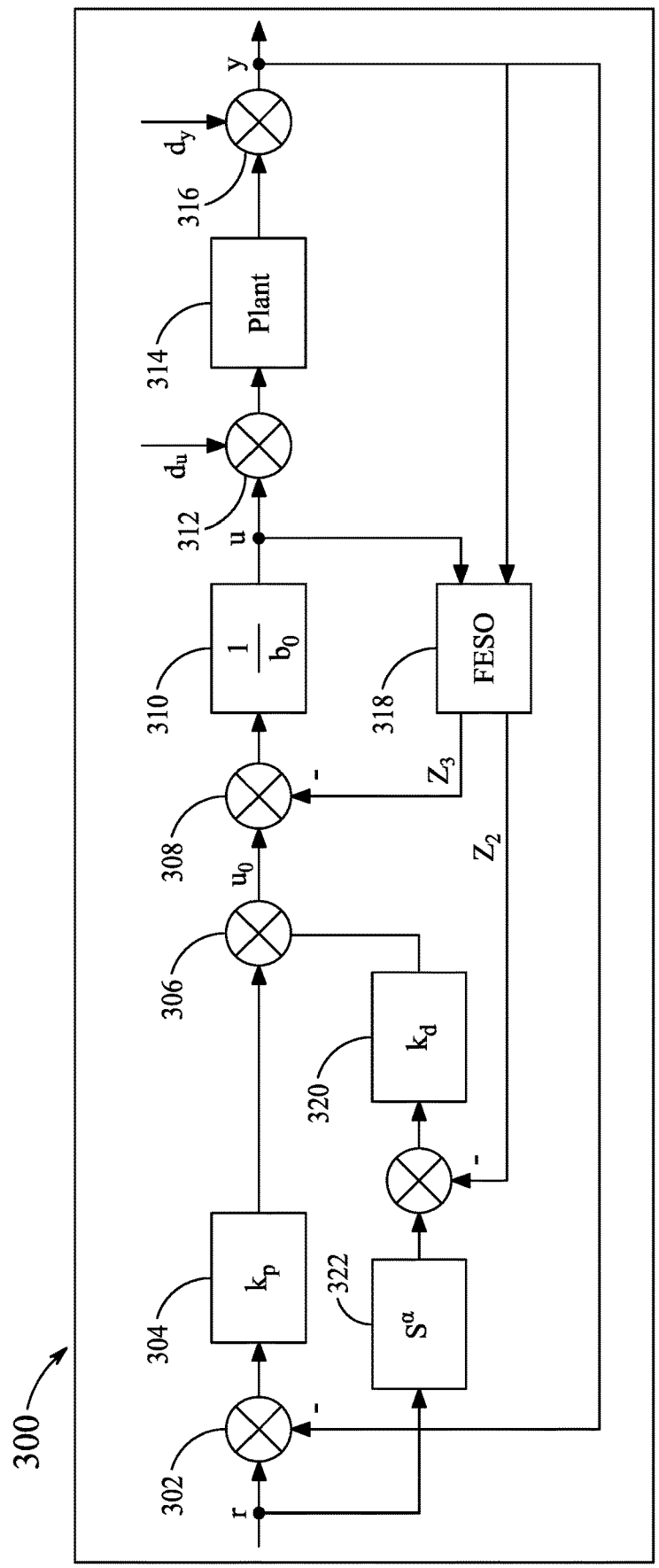
FIG. 3 is a schematic diagram of an FLADRC system, according to exemplary aspects of the present disclosure.

FIG. 3 illustrates a conventional FLADRC system 300 The FLADRC system 300 comprises a plant 314 to be controlled, an amplifier 304 with gain $k_p$, an amplifier with gain $(1/b_0)$ 310, an amplifier 320 with gain $k_d$. The FLADRC system 300 further comprises a multiplier 302, a multiplier 306, a multiplier 308, a multiplier 312, a multiplier 316, in a forward path of a closed loop of FLADRC system and a fractional-order extended state observer (FESO) 318.

Construction and operation of the forward path having the multiplier 302, the amplifier 304, the multiplier 306, the multiplier 308, the amplifier 310, the multiplier 312, the plant 314, and the multiplier 316, are substantially similar to that of FIG. 2. FLADRC 300 includes a feedback path having the FESO 318, the amplifier 320, and a block $s^\alpha$ 322. The FESO 318 estimates successive fractional derivatives of an output signal, y, that includes a output disturbance $d_y$. Using the estimated successive fractional derivatives of an output signal, y, the FESO 318 generates generalized disturbance components, namely $z_2$ and $z_3$. The generalized disturbance component $z_2$ is input to a multiplier 324. The multiplier 324 also receives input from the block $s^\alpha$ 322, which performs successive differentiation of input signal, r. Output of the multiplier 322 is provided to the amplifier 320 to amplify with gain $k_d$ and provide the amplified signal to the multiplier 306, and the generalized disturbance component $z_3$ is provided to the multiplier 308 to cancel the external disturbance.

The generalized disturbance represents the unknown internal fractional-order dynamics, the external disturbance, and the uncertainty on the system gain.

Below is a computation of a fractional differential equation for the FLADRC system 300 which solves a set-point tracking problem to yield a set-point tracking controller and a gain of the FESO 318.

In an aspect, consider a commensurate fractional order model:

$$G(s) = \frac{b}{(s^{2\alpha} + a_1 s^\alpha + a_2)}; \quad (1)$$

where $a_1, a_2 \in R$, and $\alpha \in R^+$ with $0 < \alpha < 1$.

Considering that b is known ($b = b_0$), the corresponding differential equation form for (1) is:

$$D^{2\alpha} y(t) = -a_1 D^\alpha y(t) - a_2 y(t) + b_0 u(t); \quad (2)$$

which can be rewritten as:

$$D^{2\alpha} y = f_2 + b_0 u; \quad (3)$$

$$f_2 = -a_1 D^\alpha y - a_2 y; \quad (4)$$

Assuming that $f_2$ is fractionally differentiable, let $x = [y \; D^\alpha y \; f_2]^T$ and $h = D^\alpha f_2$, a space model corresponding to above equation is:

$$D^\alpha x = Ax + Bu + Eh; \quad (5)$$

$$y = Cx; \quad (6)$$

where $$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, E = \begin{bmatrix} 0 \\ 0 \\ 1 \end{bmatrix}$$

and C=[1 0 0];

To estimate the output $x_1(t)$, its fractional derivative $x_2(t)$ and the generalized disturbance $f_2(t)$, the following FESO may be designed:

$$D^\alpha z = Az + Bu + L(y - y_0) \quad (7)$$

$$y_0 = Cz \quad (8)$$

where $L = [\beta_1\ \beta_2\ \beta_3]^T$ is the FESO gain vector to be tuned. Parameters of L are determined so that (A–LC) is asymptotically stable. To satisfy aforesaid condition in the fractional order case, instead of placing the poles in the original plane s, the poles are placed in an w plane by a transformation $\omega = s^\alpha$. A stability of the FESO in (8) may be guaranteed by appropriately choosing the poles of the integer order polynomial that are obtained. The poles must satisfy Matignon's stability conditions. Matignon's stability criteria is briefly discussed in the following paragraphs.

Matignon's Stability Condition:

The fractional order transfer function G(s)=Y(s)/R(s) is stable in s-plane if a following condition is met:

$$|\arg(\sigma)| > q\frac{\pi}{2}, \forall\ \sigma_1 \in C,\ i^{th}\ \text{root of } R(\sigma) = 0 \text{ where } s = q^\sigma. \quad (i)$$

If s=0 is the only single root of closed loop characteristic equation, then the system remains unstable. The detailed steps for stability analysis are as follows:

The general fractional order transfer function characteristic equation for stability assessment of the system is provided by:

$$a_0 s^{\beta_0} + a_1 s^{\beta_1} + a_2 s^{\beta_2} + \dots a_n s^n = \sum_{i=0}^{n} a_i s^{\beta_i} = 0 \quad (ii)$$

where $\beta_i = v_i/v$.

Mapping the fractional terms of the characteristic equation from s-plane to σ-plane to make the system of equation linear integer order:

$$\sum_{i=0}^{n} a_i s^{\frac{v_i}{v}} = \sum_{i=0}^{n} a_i \sigma^{v_i} = 0, \quad (iii)$$

where m is the least common multiple of v and $$\sigma = s^{\frac{k}{m}}.$$

For every value of $a_i$, the roots of (iii) is:

$$|\Phi_\sigma| = |\arg(\sigma)|$$

Thus, the stability conditions for fractional order systems are illustrated as:

Condition 1: if $$\frac{\pi}{2m} < |\arg(\sigma)| < \frac{\pi}{m}$$

then the system is stable.

Condition 2: if $$|\arg(\sigma)| = \frac{\pi}{m}$$

then the system is oscillatory stable.

If the above conditions 1 and 2 are not met, then the system is unstable.

Continuing with the analysis, if $z_3$ tracks the generalized disturbance $f_2$ correctly by using control law u of equation (9), equation (1) is transformed into a fractional integrator of order 2α.

$$u = \frac{-z_3 + u_o}{b_o} \quad (9)$$

The new control input, $u_0$ is designed to solve the set-point tracking problem. A fractional proportional derivative is given by:

$$u_o(t) = K_p(r(t) - y(t)) + K^d(D^\alpha r - z_2) \quad (10)$$

FIG. 3 illustrates details of the FLARDC system. The parameters of the set-point tracking controller and the gain of the FESO are given by:

$$K_p = \omega_{c_2}^2,\ K_d = 2\omega_{c_2} \quad (11)$$

$$L = [3\omega_{o_2}\ 3\omega_{o_2}^2\ \omega_{o_2}^3] \quad (12)$$

where $\omega_{c_2}$ and $\omega_{o_2}$ are bandwidth of the set-point tracking controller and the FESO in the ω-plane, respectively.

The closed-loop transfer function is provided by:

$$G_{ry}(s) = \frac{k_d s^\alpha + k_p}{s^{2\alpha} + k_d s^\alpha + k_p}; \quad (13)$$

Frequency domain analysis for the FODRS and FLADRC processes:

In the frequency domain analysis of the FODRS process, the transfer functions between the inputs u(s) and y(s) and the states $z_2(s)$ and $z_3(s)$ are computed based on the state space model of the IESO. The states are provided as:

$$\begin{cases} z_2 = G_1 u + G_2 y \\ z_3 = G_3 u + G_4 y \end{cases}; \quad (14)$$

$$G_1 = \frac{b_0 s(s + \beta_1)}{\Delta(s)}; \quad (15)$$

$$G_2 = \frac{s(\beta_3 + \beta_2 s)}{\Delta(s)}; \quad (16)$$

$$G_3 = \frac{-b_0 \beta_3}{\Delta(s)}; \quad (17)$$

-continued $$G_4 = \frac{\beta_3 s^2}{\Delta(s)}; \quad (18)$$

With $\Delta(s)=(s+\omega_{o1})^3=s^3+\beta_1 s^2+\beta_2 s+\beta_3;$ (19)

Figure 4:
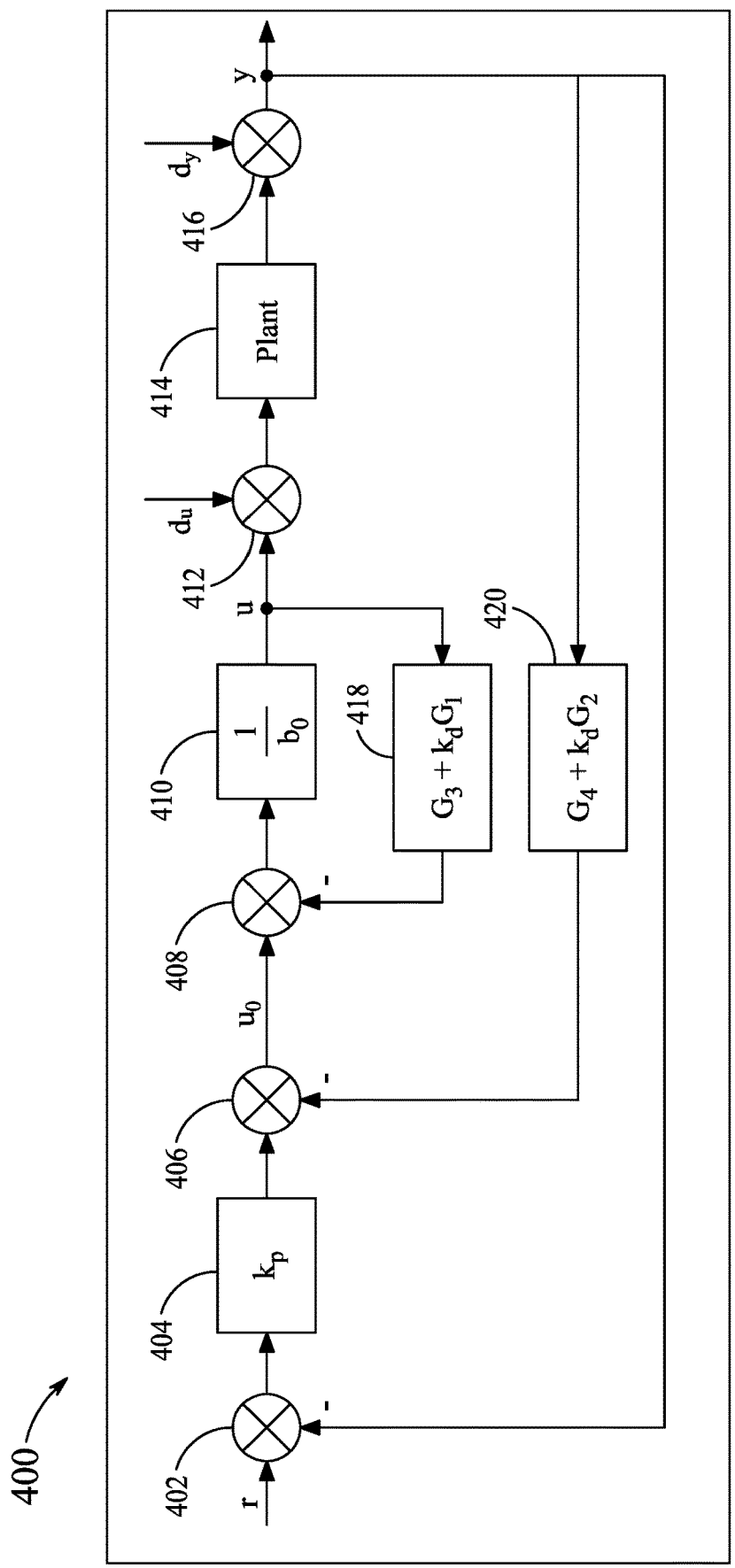
FIG. 4 is a schematic diagram of an exemplary implementation of the FLADRC system of FIG. 3, according to exemplary aspects of the present disclosure.
Figure 5:
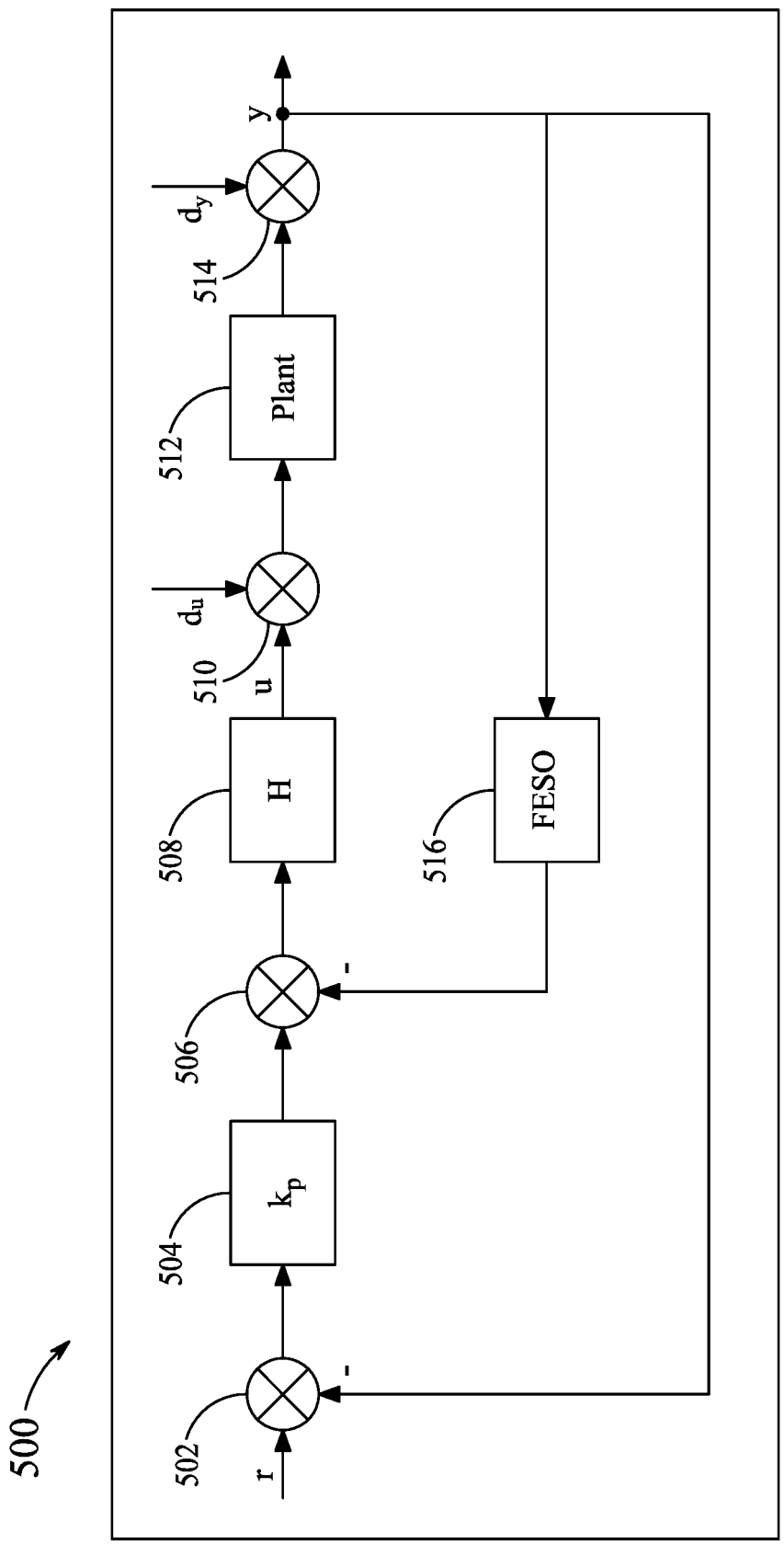
FIG. 5 is a block diagram of the FLADRC system, according to exemplary aspects of the present disclosure.

The FLADRC shown in FIG. 4 results from combining the circuit of FIG. 2 and performing the frequency domain analysis described above with regards to the FODRS process. Construction and operation of FIG. 4 is substantially similar to FIG. 2, except for block 418 and block 420. For example, elements 402-416 of FIG. 4 may substantially correspond to the elements 202-216 FIG. 2. The additional elements of block 418 and block 420 having functions $G_1$, $G_2$, $G_3$ and $G_4$ are unique to FIG. 4. Each of the functions is expressed above in equations (15)-(18). The schematic diagram shown in FIG. 4, having the above functions $G_1$, $G_2$, $G_3$ and $G_4$, may be transformed into the simpler block diagram of FIG. 5. FIG. 5 includes a multiplier 502, a multiplier 506, a multiplier 510, and a multiplier 514 in a forward path. Further, the multiplier 502, internal disturbance, $d_u$ and external disturbance, $d_y$ are substantially similar to the corresponding blocks in FIGS. 2, 3 and 4. The schematic diagram of FIG. 5 may be used to calculate different transfer functions:

$$H = \frac{\frac{1}{b_0}}{1+\frac{1}{b_0}(G_3+k_dG_1)} = \frac{1}{b_0}\frac{\Delta(s)}{d_H(s)}; \text{ and} \quad (20)$$

$$F = G4+k_dG_2 = \frac{n_F(s)}{\Delta(s)}; \quad (21)$$

Where $d_H(s)=s^3+(3\omega_{o1}+k_d)s^2+(3\omega_{o1}^2+3\omega_{o1}k_d)s;$ (22)

$n_F(s)=(\omega_{o1}^3+3\omega_{o1}^2k_d)s^2+\omega_{o1}^3k_dS;$ (23)

Based on FIG. 5, signal u may be provided by:

$u=Hk_p(r-y)-Fy=k_pHr-k_pHy-HFy;$ (24)

Further, system 500 of FIG. 5 is modeled based on equation (25) considering the external disturbances:

$s^2(y-d_y)=f_1+b_0(u+d_u);$ (25)

By rearranging the terms of (25), u may be provided by:

$$u = \frac{s^2}{b_0}y-\frac{1}{b_0}f_1-d_u-\frac{s^2}{b_0}d_y; \quad (26)$$

The result of equating (24) and (26) for signal u is provided by:

$$y = \frac{k_pH}{\Delta_y(s)}r+\frac{f}{b_0\Delta_y(s)}+\frac{1}{\Delta_y(s)}d_u+\frac{s^2}{b_0\Delta_y(s)}d_y; \quad (27)$$

$$\text{where } \Delta_y(s) = \frac{s^2}{b_0}+k_pH+HF = \frac{s^2d_H(s)+k_p\Delta(s)+n_F(s)}{b_0d_H(s)}; \quad (28)$$

$$\Delta_y(s) = \frac{\Delta_{cl}(s)\Delta(s)}{b_0d_H(s)}; \quad (29)$$

where the polynomials $\Delta(s)$ and $d_H(s)$ are respectively defined by the aforesaid equations (19) and (22) discussed in the frequency domain analysis of the FODRS process and $\Delta_{cl}(s)$ is the characteristic polynomial of the closed-loop reference model.

Considering that the generalized disturbance $f_1(t)$ is well estimated, the transfer functions between the different inputs and the output may be provided by:

$$G_{ry}(s) = \frac{k_p}{s^2+k_ds+k_p}; \quad (30)$$

$$G_{fy}(s) = \frac{s^3+(3\omega_{01}+k_d)s^2+(3\omega_{01}^2+3\omega_{01}k_d)s}{(s^2+k_ds+k_p)(s^3+3\omega_{01}s^2+3\omega_{01}^2s+\omega_{01}^3)}; \quad (31)$$

$$G_{d_uy}(s)=b_0G_{fy}(s); \quad (32)$$

$$G_{d_yy}(s)=s^2G_{fy}(S); \quad (33)$$

Since the FLADRC process is based on a three-state observer, determinations made for the FODRS process are applicable to determine the expressions of the estimated states, $z_2$ and $z_3$. The expression for $z_2$ and $z_3$ is achieved by replacing s with $s^\alpha$ in the expressions of the FODRS process. The control law is modified as:

$u_o=K_p(r-y)-K_dz_2;$ (34)

which provides a closed-loop a transfer function:

$$G_{ry}(s) = \frac{k_p}{s^{2\alpha}+k_ds^\alpha+k_p}; \quad (35)$$

Further, by replacing s with $s^\alpha$ in the expressions of the FODRS process, the transfer functions between the different inputs and the output are obtained for the FLADRC process:

$$G_{fy}(s) = \frac{s^{3\alpha}+(3\omega_{01}+k_d)s^{2\alpha}+(3\omega_{01}^2+3\omega_{01}k_d)s^\alpha}{(s^{2\alpha}+k_ds^\alpha+k_p)(s^{3\alpha}+3\omega_{01}s^{2\alpha}+3\omega_{02}^2s^\alpha+\omega_{02}^3)}; \quad (36)$$

$$G_{d_uy}(s)=b_0G_{fy}(s) \quad (37)$$

$$G_{d_yy}(s)=s^{2\alpha}G_{fy}(s) \quad (38)$$

The FODRS and FLADRC processes described above suffer from common disadvantages like complex controller design procedure and are less robust to gain variations. In particular, it is seen in the FLADRC process that the non-integer order of the system is dependent on the non-integer order of the model representing the system to be controlled. As a result, the required closed-loop response is not imposed.

Figure 6:
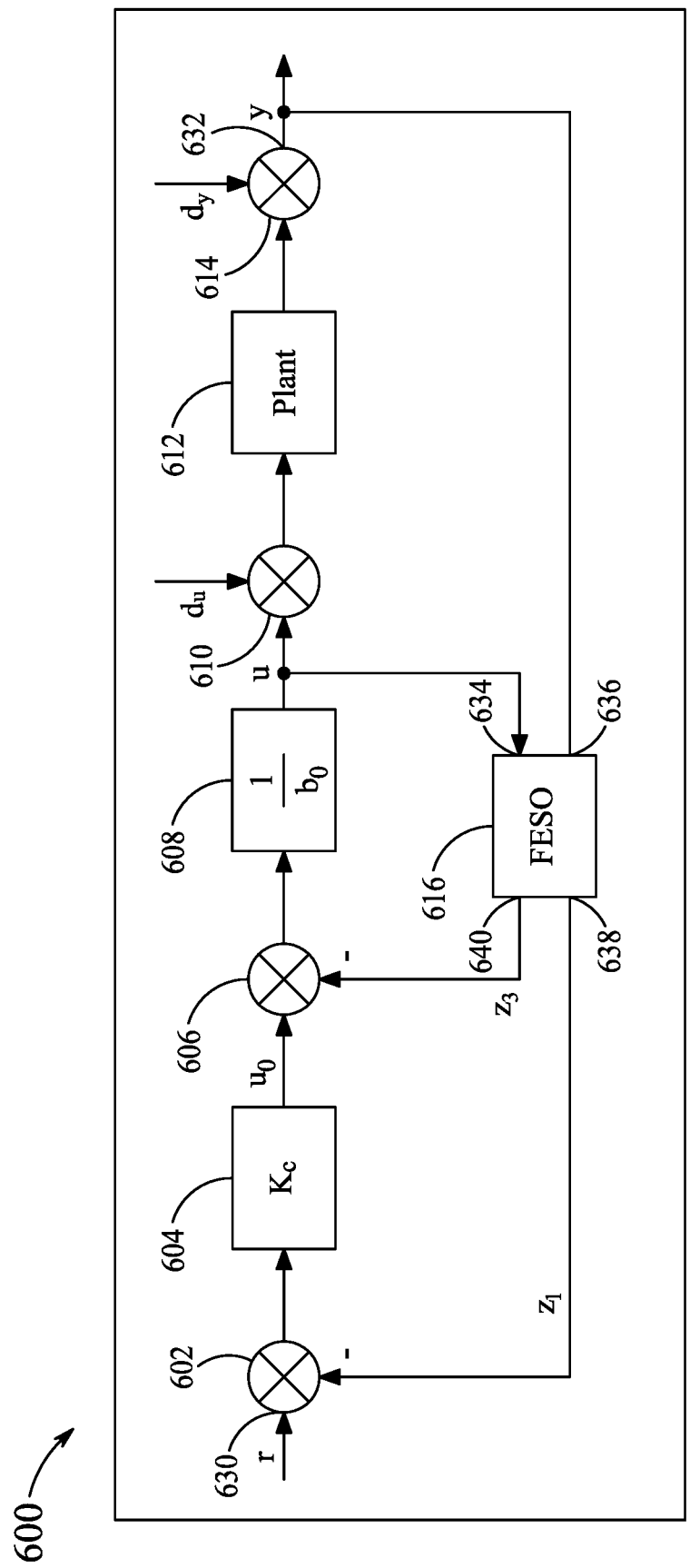
FIG. 6 is a schematic diagram of a fractional order LADRC system, according to exemplary aspects of the present disclosure.

FIG. 6 illustrates the fractional order LADRC (FO-LADRC) system 600 of the present disclosure. The FOLADRC system 600 includes an FESO controller circuit for a closed loop plant control which is modified with respect to the FESO controllers of FIG. 3 and FIG. 5. The FESO controller circuit has an input port 630 to receive an input signal, r and an output port 632 for generating an output signal, y. The FESO controller circuit comprises a first amplifier 604 having a first gain $K_c$ and a second amplifier 608 having a second gain $(b_o)^{-1}$. The FESO controller circuit includes a first multiplier 602, a second multiplier 606, a third multiplier 610 and a multiplier 614 in the forward path of a closed loop. The FESO controller circuit further includes a fractional order state extended observer (FESO) controller 616.

The first multiplier 602 is connected to the input port 630 of the FESO controller circuit. The input port 630 of the FESO controller circuit receives the input signal, r. The first amplifier 604 connected to the first multiplier 602 receives the input signal, r, from output of the first multiplier 602. The first amplifier 604 multiplies the input signal, r by the first gain $K_c$, to generate a modified signal, $u_o$. The modified signal, $u_o$, is input to the second amplifier 608 through the second multiplier 606. The second amplifier 608 generates a process variable, u from the modified signal, $u_o$. The second amplifier 608 generates the process variable, u, by multiplying the modified signal, $u_0$ by the static gain, $(b_o)^{-1}$ of the second amplifier. During operation, the FOLADRC system may experience external disturbances referred to as a first disturbance, $d_u$. The third multiplier 610 coupled to output of the second amplifier 608, is configured to multiply the process variable, u, and the first disturbance, $d_u$. The output of the third multiplier 610 is coupled to an input of a plant 612. The input to the plant 612 is a combined input of u impacted by the first disturbance, $d_u$. The multiplier 614 receives output of the plant 612 and an output disturbance referred to as a second disturbance, $d_y$. The multiplier 614 generates a disturbed output, y by multiplying the output of the plant 612 and the second disturbance, $d_y$.

The FESO controller 616 includes a first FESO controller input 634, a second FESO controller input 636, a first FESO controller output 638 and a second FESO controller output 640. Also, the FESO controller has an observer gain vector (L) and a cross over frequency bandwidth, $\omega_c$. The first FESO controller input 634 receives the process variable, u, as a feedback from the second amplifier 608. The second FESO controller input 634 receives disturbed output, y from an output port which is output of the multiplier 614. The FESO controller 616 has circuitry and one or more processor(s) having program instructions configured to perform fractional order linear active disturbance rejection control (FOLADRC). The FESO controller 616 may use the process variable, u, and the output signal y, to estimate a first disturbance and a second disturbance. Based on the estimation, the FESO controller 616 generates a first disturbance cancelling feedback signal, $z_1$, and a second disturbance cancelling feedback signal, $z_3$. The FESO controller 616 transmits the first disturbance cancelling feedback signal, $z_1$ to the first multiplier 602 through the first FESO controller output 638. The first multiplier 602 multiplies the first disturbance cancelling feedback signal, $z_1$, with the input signal, r. The second disturbance cancelling feedback signal $z_3$ is transmitted to the second multiplier, 606 through the second FESO controller input 640. The second multiplier 606 multiplies the second disturbance cancelling feedback signal, $z_3$, with the modified signal $u_0$. The first disturbance cancelling feedback signal $z_1$, and the second disturbance cancelling feedback signal $z_3$ and recursive estimation of the first disturbance and the second disturbance leads to suppression of the first disturbance and the second disturbance observed by the fractional order LADRC system. The FESO controller 616 incrementally changes the observer gain vector, L, and the FESO controller bandwidth, w, until a closed loop transfer function of the FESO controller converges.

The FESO controller 616, configured to reject disturbances, may modify the process variable, u, back toward a desired set-point whenever disturbance on the plant 612 causes a deviation. In dynamical systems and control theory, a fractional-order system is a dynamical system that can be modeled by a fractional differential equation containing derivatives of non-integer order. Such system is said to have fractional dynamics. It is required to compute a fractional differential equation for the present FESO controller circuit and arrive at a stage to solve the set-point tracking problem to yield system parameters and various constraints for controller design.

For example, a non-commensurate fractional order model is given by:

$$G(s) = \frac{b}{(s^{\alpha_2} + a_1 s^\alpha + a_2)}; \tag{39}$$

where $a_1, a_2 \in R$, and $\alpha_1, \alpha_2 \in R^+$ with $0 < \alpha_2 < 2$ and $\alpha_1 < \alpha_2$ A differential equation (40) corresponding to the above non-commensurate fractional order model (39) is provided by:

$$D^{\alpha_2} y(t) + a_1 D^{\alpha_1} y(t) + a_0 y(t) = bu(t); \tag{40}$$

The differential equation (40) may be transformed into:

$$D^{2\lambda} y(t) - D^{2\lambda} y(t) + D^{\alpha_2} y(t) + a_1 D^{\alpha_1} y(t) + a_2 y(t) = bu(t) + b_0 u(t) - b_0 u(t) \tag{41}$$

The equation (41) may be modified to a form of a basic model as provided below:

$$D^{2\lambda} y(t) = b_0 u(t) + f(t); \tag{42}$$

where u(t) is the input, y(t) is the output and f (t) is a generalized disturbance. The equation (42) includes all parameters of a system to be controlled i.e., the non-integer order $\alpha_1$ and $\alpha_2$, as well as the coefficients $a_1$, $a_2$ and b. The generalized disturbance, f(t) is given by:

$$f(t) = D^{2\lambda} y(t) + D^{\alpha_2} y(t) - a_1 D^{\alpha_1} y(t) - a_2 y(t) + (b - b_0) u(t) \tag{43}$$

A design of the FESO controller 616 is described below:

A first step of designing the FESO controller 616 involves estimation of the generalized disturbance, f(t) with following space state model:

$$\begin{cases} D^{2\lambda} z(t) = Az(t) + Bz(t) + L(y(t) - y_0(t)) \\ y_0(t) = Cz(t) \end{cases}; \tag{44}$$

where $$A = \begin{bmatrix} 0 & 1 \\ 0 & 0 \end{bmatrix}, B = \begin{bmatrix} b_0 \\ 0 \end{bmatrix}, E = \begin{bmatrix} 0 \\ 1 \end{bmatrix}$$

and C=[0 1], and $z(t)=[y(t)\ f(t)]^T$, $L=[\beta_1\ \beta_2]^T$ is the gain vector of the FESO controller 616 which is to be determined. A corresponding characteristic polynomial is provided by:

$$\Delta(s) = s^{4\lambda} + \beta_1 s^{2\lambda} + \beta_2 = (s^{2\lambda} + \omega_0)^2 \tag{45}$$

To ensure a convergence of the FESO controller, $\beta_1$ and $\beta_2$ are calculated such that the roots of the integer order polynomial corresponding to the above characteristic polynomial by the change of variable $\omega = s^{2\lambda}$ satisfies the Matignon's stability condition as discussed above with $\omega_0$ being the FESO controller frequency. Thus, a gain vector L of FESO controller gain is designed by:

$$L = [2\omega_0\ \omega_0^2] \tag{46}$$

A following control law expression is used to cancel the generalized disturbance, f(t):

$$u = \frac{-z_3 + u_o}{b_o} \quad (47)$$

where $z_3(t)$ is the estimate of f(t). With an association of the FESO controller 616 with the system by using the control law, the function (43) becomes a fractional integrator of order $2\lambda$.

$$\frac{y(s)}{u_0(s)} = \frac{1}{s^{2\lambda}}; \quad (48)$$

The second step lies in solving the set-point tracking problem. In an aspect, a new input $u_0(t)$ is used to solve the set-point tracking problem. To make the control structure more robust, a Bode's ideal transfer function (ITF), is chosen as a reference to the closed-loop transfer function.

$$G_{ref}(s) = \frac{\omega_c}{s^\mu + \omega_c}; \quad (49)$$

To achieve this, the following control law is used:

$$u_o(t) = K_c(r(t) - z_1(t)) \quad (50)$$

or simply, $u_o = K_c(r - z_1)$, where $z_1(t)$ is the estimate of y(t). In this case, the closed-loop transfer function is:

$$G_{ry}(s) = \frac{k_c}{s^{2\lambda} + k_c}; \quad (51)$$

where s is the Laplace transform of output, y and $\lambda$ is a non-integer order of the FOLADRC process, wherein $\lambda$ equals $(\log \omega)/2$.

The parameters of the FESO controller are given by:

$$\lambda = \mu/2, K_c = \omega_c; \quad (52)$$

where $\mu$ is a constant.

In the FESO controller design, the non-integer order is introduced to impose robustness on the closed-loop. The robustness quality of the closed loop depends on the non-integer order of a FOLADRC process. The fractional order aspect of the closed-loop behavior in the FOLADRC process is not imposed by the fractional order system to be controlled (i.e., the plant) as seen in the state-of-art design methods. Said fractional order aspect of the closed-loop contributes to the robustness against system gain variations and builds a robust control process having minimum control design parameters.

The third step lies in choosing the values of $\omega_c$. The Crone approximation may be used to implement the fractional order integration operator of the FESO controller.

Crone Approximation:

To find a transfer function that approximate the behaviour of fractional transfer function, a most commonly used approximation method of a Crone approximation is used. The Crone approximation has N poles and N zeros within a frequency range $[\omega_l, \omega_h]$ and is given by:

$$S^z \approx C \prod_{m=1}^{N} \frac{1 + \frac{s}{\omega_{\zeta,m}}}{1 + \frac{s}{\omega_{\pi,m}}} \quad (A)$$

$$\omega_{\zeta,m} = \omega_l \left(\frac{\omega_h}{\omega_l}\right)^{\frac{2m-1-z}{2N}} \quad (B)$$

$$\omega_{\pi,m} = \omega_l \left(\frac{\omega_h}{\omega_l}\right)^{\frac{2m-1-z}{2N}} \quad (C)$$

If z is real, the correct gain at 1 rad/s, which is $|(j\omega)^\alpha|=1$, $\forall \alpha$ a must be set by adjusting C. If z is complex, both gain and phase at 1 rad/s must be set by adjusting C. For simpler calculations, a frequency of 1 rad/s is chosen. If the frequency of 1 rad/s falls outside the range of $[\omega_l, \omega_h]$, any other suitable frequency may be used for calculation.

If $|z|$ is less than one, the relation (A) is valid for the frequency range $[10\omega_l, 0.1\omega_h]$. Both gain and phase have ripples, which decrease as N increases. Typically, N should be at least equal to the number of decades in $[\omega_l, \omega_h]$ for acceptable results. When $|z|$ is greater than one, the frequency range in which the approximation behaves acceptably becomes narrower, and approximations such as $S^z = S^{\lceil R(z) \rceil} S^{z - \lceil R(z) \rceil}$ or $S^z = S^{\lfloor R(z) \rfloor} S^{z - \lfloor R(z) \rfloor}$ (for which only the last term needs to be approximated) are employed.

Continuing with the step of choosing the values of $\omega_c$, it is ensured that the phase difference between the input signal, r, and the output signal, y, is constant within a frequency range between a minimum frequency, $\omega_L$, and a maximum frequency, $\omega_H$, wherein $\omega_L \leq \omega_C \leq \omega_H$. For achieving aforesaid range, $\omega_L$ is chosen to be as small as possible and $\omega_H$ is chosen to be larger than $\omega_C$ but should not exceed in such a way that system noise is boosted.

As described, the Bode ITF addresses the robustness property for fractional-order controllers. For the Bode ITF, the ideal shape of a Nyquist plot for the open loop frequency response is a straight line in a complex plane which provides a theoretically infinite gain margin. For example, an ideal open-loop transfer function is given by:

$$L(s) = \left(\frac{s}{\omega_{gc}}\right)^\alpha \quad (53)$$

where $\omega_{gc}$ is the desired gain cross over frequency and $\alpha < 0$ is the slope of the ideal cut-off characteristic. The amplitude curve is a straight line of constant slope $-20\alpha$ dB/dec, and the phase curve is a horizontal line at $\alpha\pi/2$ rad. The Nyquist curve consists of a straight line through the origin with $|L(j\omega)| = \alpha\pi/2$ rad.

The Bode's ITF for closed loop is given by:

$$G_{cl}(s) = \frac{\omega_c}{s^\mu + \omega_c} \quad (54)$$

A step response of the closed-loop system may exhibit an iso-damping property (that is the overshoot may depend on $\mu$) In the fractional order LADRC process, $G_{cl}(s)$ is used as a closed-loop reference model to tune the control law parameters. The FESO controller 616 design may be based on two parameters of the reference model, $\mu$ and $\omega_c$, and the FESO controller bandwidth frequency, $\omega_0$. The fractional order $\mu$ can be deduced from the phase margin, $\varphi_m$ by:

$$\mu = \frac{\pi - \varphi_m}{\pi/2} \qquad (55)$$

By comparing Bode's ITT' for closed loop with the closed-loop transfer function of the FESO controller, the fractional order may be derived as $\mu=2\lambda$.

The advantage achieved through the structure of Bode ITF is iso-damping, i.e., overshoot being independent of the payload or the system gain. Iso-damping is a desirable system property referring to a state where the open-loop phase Bode plot is flat. The phase derivative with respect to the frequency is zero at a tangent frequency, $\omega_c$. At the tangent frequency, the Nyquist curve of the open-loop system tangentially touches the sensitivity circle. The phase Bode plot is locally flat, which implies that the system is robust to gain variations. For systems that exhibit iso-damping property, the overshoots of the closed-loop step responses remain constant for different values of the controller gain. Thus, the closed-loop system is robust to gain variations.

The iso-damping property may be expressed as $$\left.\frac{d\angle G(s)}{ds}\right|_{s=jw_c} = 0$$

or equivalently:

$$\left.\angle\frac{dG(s)}{ds}\right|_{s=jw_c} = \angle G(s);$$

where $\omega_c$ is the tangent frequency and $G(s)$ is the open-loop system transfer function.

Bode's ideal control loop frequency response has the fractional integrator shape and provides the iso-damping property around the gain crossover frequency, $\omega_c$. The phase margin and the maximum overshoot are defined by one parameter (the fractional power of s) and are independent of open-loop gain.

The frequency domain analysis of fractional order LADRC process is based on the IESO using only two states. Therefore, the expression of the state variable $z_2(s)$ is given by:

$$z_2 = \frac{-b_0 \beta_2}{\Delta(s)} u + \frac{\beta_2 s^{2\lambda}}{\Delta(s)} y \qquad (56)$$

To solve the set-point tracking problem, the control law is:

$$u_o(t) = K_c(r(t) - z_1(t)) \qquad (57)$$

The transformation leads to the simplified diagram of FIG. 5 where:

$$H(s) = \frac{\frac{1}{b_0}\Delta(s)}{s^{2\lambda}(s^{2\lambda}+\beta_1)}; \text{ and } F(s) = \frac{\beta_2 s^{2\lambda}}{\Delta(s)}; \qquad (58)$$

Further, the transfer functions between the different inputs and the output for the fractional order LADRC process are provided by:

$$G_{ry}(s) = \frac{k_p}{s^{2\alpha} + k_d s^\alpha + k_p}; \qquad (59)$$

$$G_{fy}(s) = \frac{s^{3\alpha} + (3\omega_{01} + k_d)s^{2\alpha} + (3\omega_{01}^2 + 3\omega_{01}k_d)s^\alpha}{(s^{2\alpha} + k_d s^\alpha + k_p)(s^{3\alpha} + 3\omega_{01}s^{2\alpha} + 3\omega_{02}^2 s^\alpha + \omega_{02}^3)}; \qquad (60)$$

$$G_{d_u y}(s) = b_0 G_{fy}(s); \qquad (61)$$

$$G_{d_y y}(s) = s^{2\alpha} G_{fy}(s) \qquad (62)$$

Figure 7:
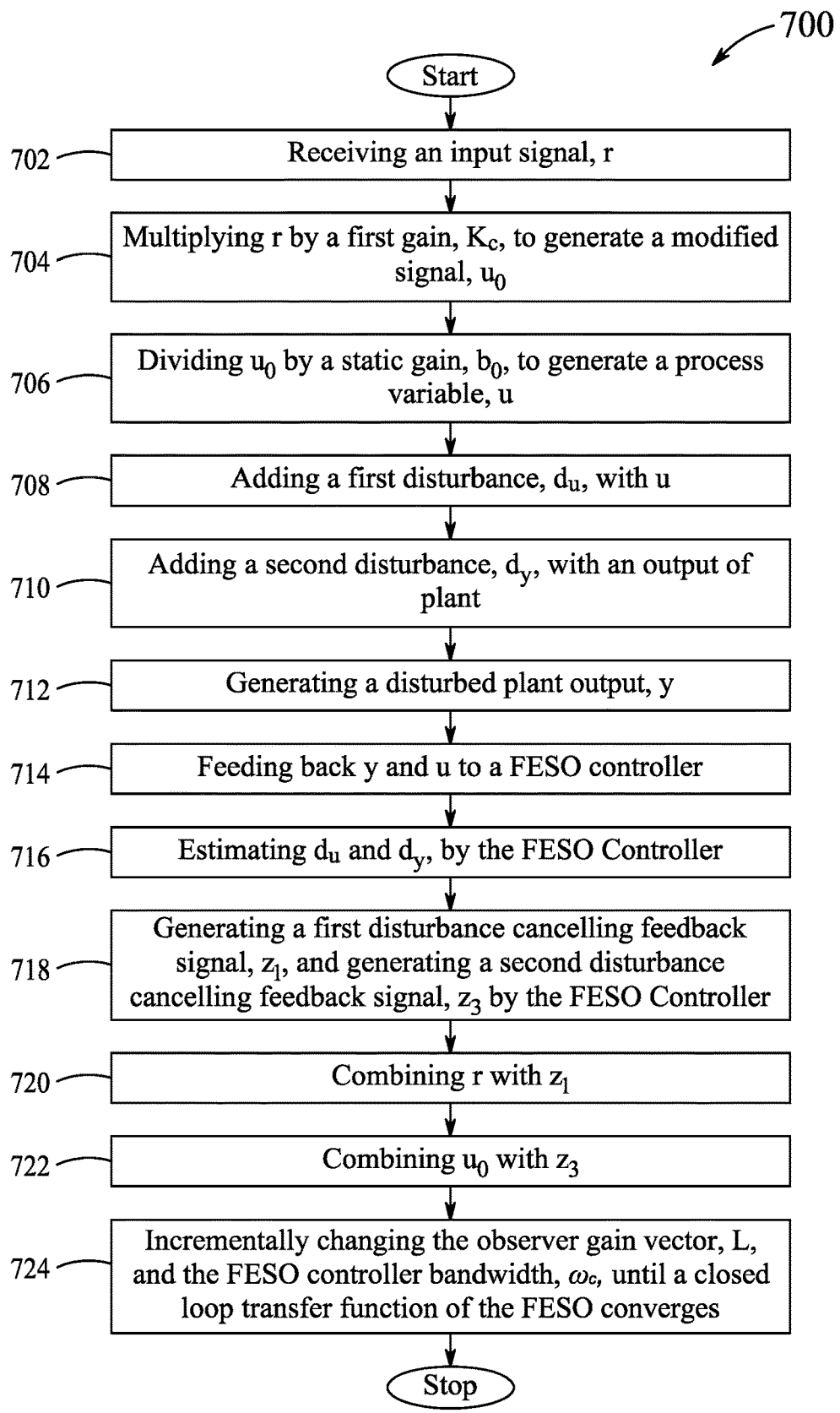
FIG. 7 is an exemplary flowchart of a method illustrating a fractional order LADRC method, according to exemplary aspects of the present disclosure.

FIG. 7 shows an exemplary flowchart of the present invention illustrating a fractional order LADRC method for the FESO controller circuit 600 of FIG. 6, according to exemplary aspects of the present disclosure.

At step 702, the method includes receiving an input signal, r.

At step 704, the method includes multiplying the input signal, r with the gain ($K_c$) of the first amplifier to generate a modified signal, $u_0$.

At step 706, the method includes multiplying the modified signal with the static gain $(b_0)^{-1}$ of the second amplifier to generate a process variable, u. The step 706 may also be interpreted as dividing the modified signal, $u_0$ by a static gain, $b_0$ of the second amplifier to generate a process variable, u.

At step 708, the method includes multiplying the first disturbance, $d_u$ with the process variable, u, at the input to the plant. The first disturbance, du (input disturbance) impacts the actual input to the plant.

At step 710, the method includes multiplying the second disturbance, $d_y$ with the output of the plant. The second disturbance, $d_y$ (output disturbance) affects the actual output of the plant.

At step 712, the method includes generating a disturbed plant output, y.

At step 714, the method includes feeding back the disturbed plant output, y, and the process variable, u, to the FESO controller 616.

At step 716, the method includes estimating the first disturbance, $d_u$ (input disturbance) and the second disturbance, $d_y$ (output disturbance) by the FESO controller 616.

At step 718, the method includes generating the first disturbance cancelling feedback signal, $z_1$, and the second disturbance cancelling feedback signal, $z_3$.

At step 720, the method includes combining the input signal, r with the first disturbance canceling feedback signal, $z_1$.

At step 722, the method includes combining the modified signal, $u_0$ with the second disturbance cancelling feedback signal, $z_3$.

At step 724, the method includes incrementally changing the observer gain vector, L and the FESO controller bandwidth, $\omega_c$ by the FESO controller 616 until a closed loop transfer function of the FESO controller 616 converges.

Experimental Results:

Consider the transfer function of fractional order linear system expressed as:

$$G(s) = \frac{1.25}{(s^{1.8} + 0.625 s^{0.9} + 1.25)}; \qquad (63)$$

formed by equation (35) for $k_p=1.25$, $\alpha=0.9$ and $k_d=0.625$.

Table 1 shows parameters of a closed-loop reference model. The FLADRC, the FODRS and the FOLADRC circuits are each designed in a closed loop fashion to obtain performances in time and frequency domains such as an overshoot of 15% at time t=0.6 s that corresponds to a phase margin of 60° and a gain crossover frequency, $\omega_c$=5 rad/s.

TABLE 1

Closed-loop reference model

| | Model | Parameters |
|---|---|---|
| FODRS | $\dfrac{\omega_n^2}{s^2 + 2z\omega_n s + \omega_n^2}$ | $z = 0.333$, $\omega_n = 5.1$ rad/s |
| FLADRC | $\dfrac{\omega_n^2}{s^{1.8} + 2z\omega_n s^{0.9} + \omega_n^2}$ | $z = 0.51$, $\omega_n = 6.5$ rad/s |
| Fractional order LADRC | $\dfrac{\omega_c}{s^{2\lambda} + \omega_c}$ | $\lambda = {}^2\!/\!_3$, $\omega_c = 10$ rad/s |

In comparing the performance of the FLADRC, FODRS and FOLADRC processes, the reference input r(t) is considered as a unit step input signal at t=0 s. The disturbance at the control signal is a step signal of amplitude 10 at t=5 s and the disturbance at the system output has an amplitude of 0.01 at t=10 s. The value of the amplitude of the disturbance on the input is made high to test the robustness of the three control structures with respect to the disturbance.

Table 2 summarizes a comparison of the characteristics of the closed-loop step response for the three methods where $\omega_c$ (rad/s) is the gain crossover frequency, $\varphi_m$ is the phase margin, $M_p$ % is the overshoot of the closed-loop step response and $t_p$ is the time of the overshoot.

TABLE 2

Comparison of The Closed-Loop Step Responses

| | $\omega_c$ (rad/s) | $\varphi_m$ (in degree) | $M_p$ % | $t_p$ |
|---|---|---|---|---|
| FODRS | 5.08 | 52.4 | 15.5 | 0.58 |
| FLADRC | 5.15 | 52.5 | 16.0 | 0.56 |
| FOLADRC | 5.61 | 60 | 15.6 | 0.59 |

Table 3 summarizes the maximum deviations of the output due to the external disturbances and the time required to reject the deviations.

TABLE 3

Deviation of the output signal due to the disturbance on the input and the output

| | $\Delta_{ymax\text{-}du}$ | $ts_{du}$ | $\Delta_{ymax\text{-}dy}$ | $ts_{dy}$ |
|---|---|---|---|---|
| FODRS | 0.015 | 2s | 0.036 | 1.8 |
| FLADRC | 0.019 | 2s | 0.030 | 1.8 |
| FOLADRC | 0.017 | 2s | 0.011 | 0.6 |

Table 2 and Table 3 show that the FOLADRC process has improved phase margin and improved output disturbance cancellation over the FLADRC and FODRS processes.

Table 4 summarizes values of the overshoot of the closed-loop step response due to variation of $u_0$, obtained for the three control structures. The overshoot of the step response changes drastically for the FLADRC and FODRS process. The overshoot remains constant for the FOLADRC process.

TABLE 4

Overshoot of the closed-loop step response due to the variation of $u_0$

| | $u_0 = 0.5 \times u_{0\text{-}nom}$ | $u_{0\text{-}nom}$ | $u_0 = 1.5 \times u_{0\text{-}nom}$ |
|---|---|---|---|
| FODRS | 9.8% | 16.0% | 26.1% |
| FLADRC | 8.5% | 15.6% | 29.2% |
| FOLADRC | 14.8% | 15.6% | 16.0% |

Figure 8A:
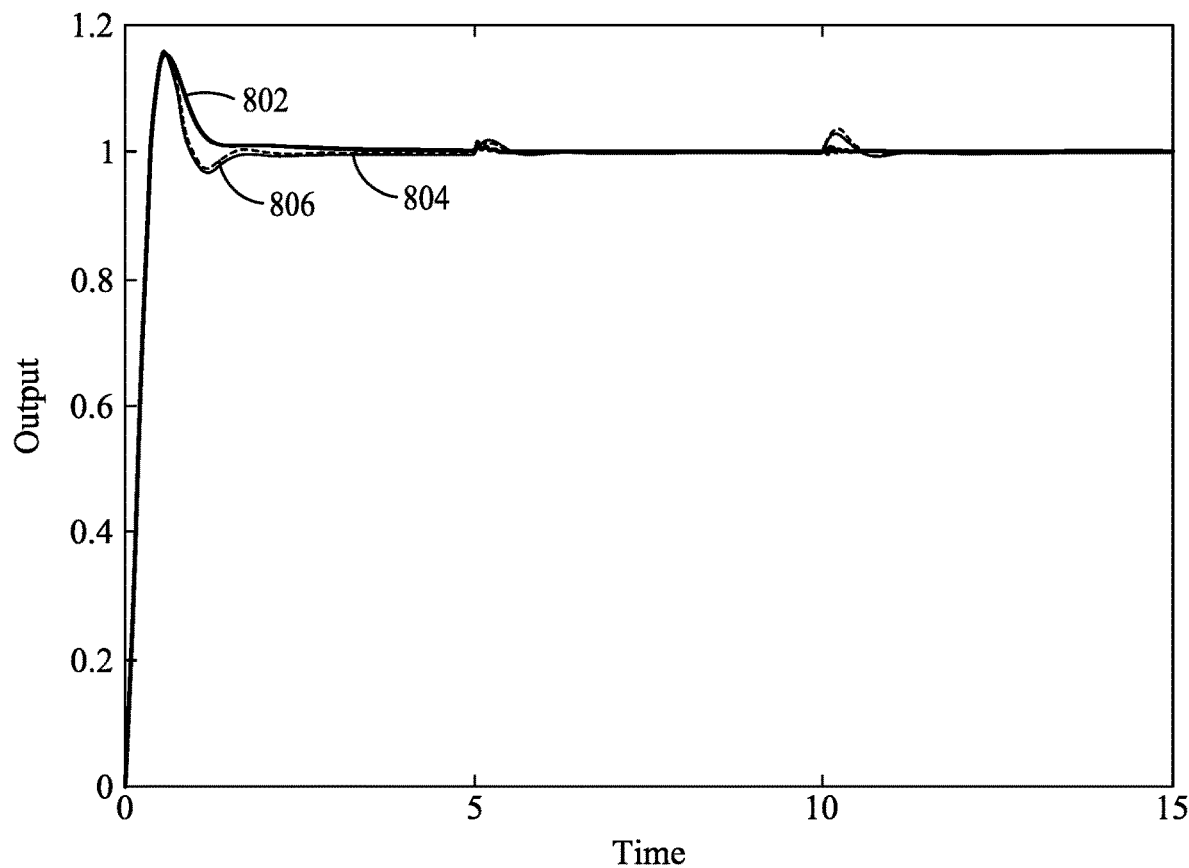
FIG. 8A is an illustration of a closed-loop performance in reference tracking and disturbance rejection for three control processes—the FODRS process, the FLADRC process, and the fractional order LADRC process, according to exemplary aspects of the present disclosure.
Figure 8B:
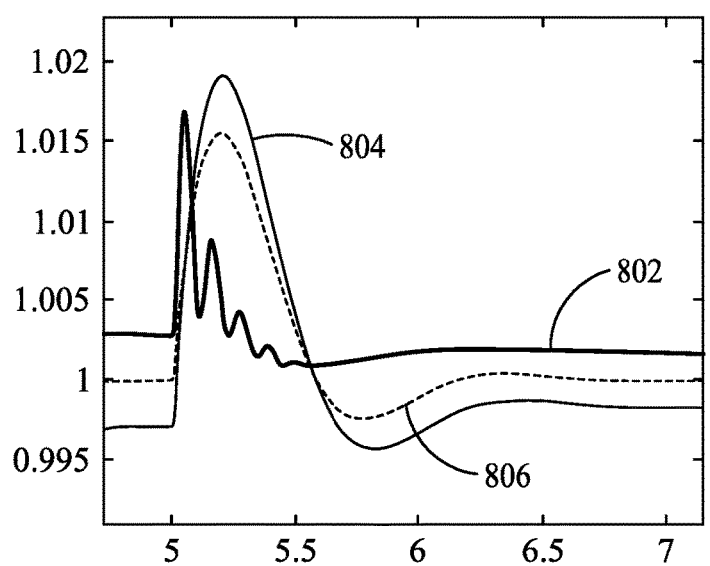
FIG. 8B is an enlarged sub-plot indicating the closed-loop performance at t=5 s of FIG. 8A, according to exemplary aspects of the present disclosure.
Figure 8C:
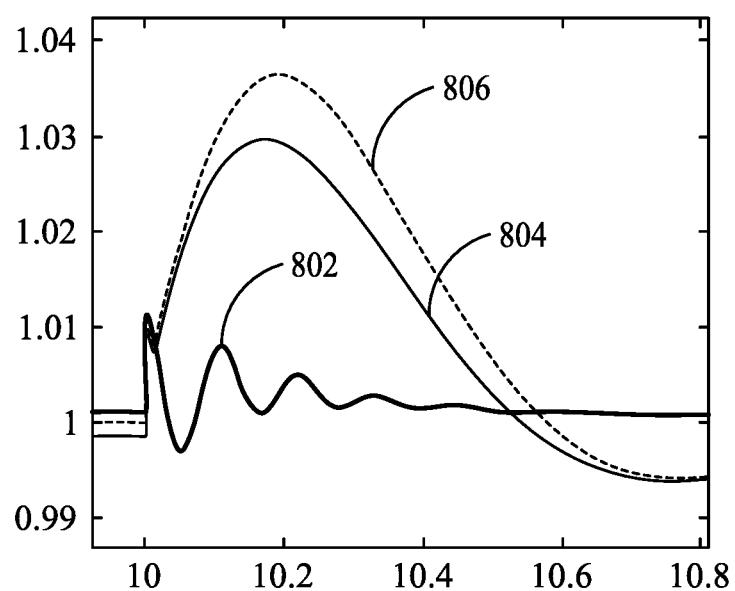
FIG. 8C is an enlarged sub-plot indicating the closed-loop performance at t=10 s of FIG. 8A, according to exemplary aspects of the present disclosure.

FIG. 8A-8C show a closed-loop performance in reference tracking and disturbance rejection for three control processes, i.e., the FOLADRC (802) process, FODRS (804) process and FLADRC (806) process, according to exemplary aspects of the present disclosure. FIG. 8A illustrates a main plot and FIG. 8B and FIG. 8C illustrate two sub-plots. FIG. 8A illustrates the closed-loop performance in reference tracking and disturbance rejection for the three control processes. FIG. 8B illustrates an enlarged sub-plot that is observed at t=5 s of FIG. 8A. FIG. 8B illustrates an enlarged sub-plot that is observed at t=10 s from of FIG. 8A. The first and second sub-plots illustrate an enlarged view of disturbance rejection behavior. The main plot and two sub-plots illustrate step responses of closed loop. The plots of FIG. 8A-8C reveal the trend of $u_0$ ($u_0(t)=K_c(r(t)+z_1(t))$), as the aforesaid control law equation relates to the reference signal z or any such equation of the fractional LADRC system that relates z and exhibit the disturbance suppression.

Figure 9A:
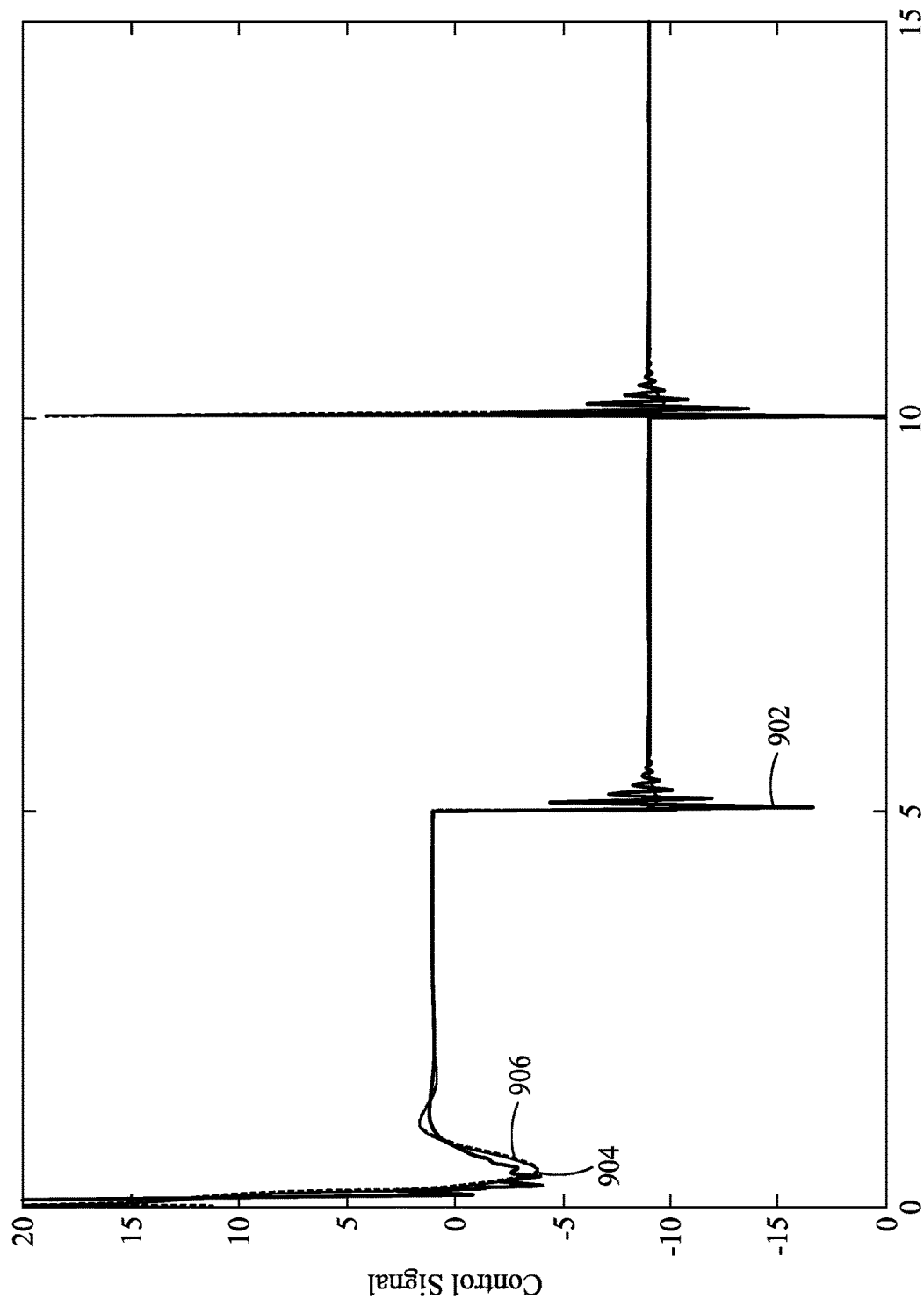
FIG. 9A is an illustration of a control signal of the closed loop for the FODRS process, the FLADRC process, and the fractional order LADRC process, according to exemplary aspects of the present disclosure.

FIG. 9A-9D show a control signal of the closed-loop for three methods—the FOLADRC (902) process, the FODRS (904) process and the FLADRC (906) process, according to exemplary aspects of the present disclosure. FIG. 9A shows the trend of control signal of the closed-loop for the three processes. FIG. 9A shows an enlarged sub-plot showing the trend of the control signal of the closed-loop for three processes at t=0 s. FIG. 9B shows an enlarged sub-plot showing the trend of the control signal of the closed-loop for the three processes at t=5. FIG. 9A shows an enlarged sub-plot showing the trend of the control signal of the closed-loop for three methods at t=10. FIG. 9A—9D illustrate significant improvement of the FOLADRC (902) process over the FODRS (904) and the FLADRC (906) processes. The plot shows flatness of the phase around the gain crossover frequency for the process of FOLADRC (902) as compared to the FODRS (904) and the FLADRC (906) processes. Such flatness results in enhanced robustness with respect to the gain variation of the reference signal tracking controller or set point tracking controller. This enhanced immunity to said gain variation is a result of the iso-damping property which the FESO controller circuit has achieved due to the selection of the Bode's ITF as the transfer function of the FESO controller.

Figure 10A:
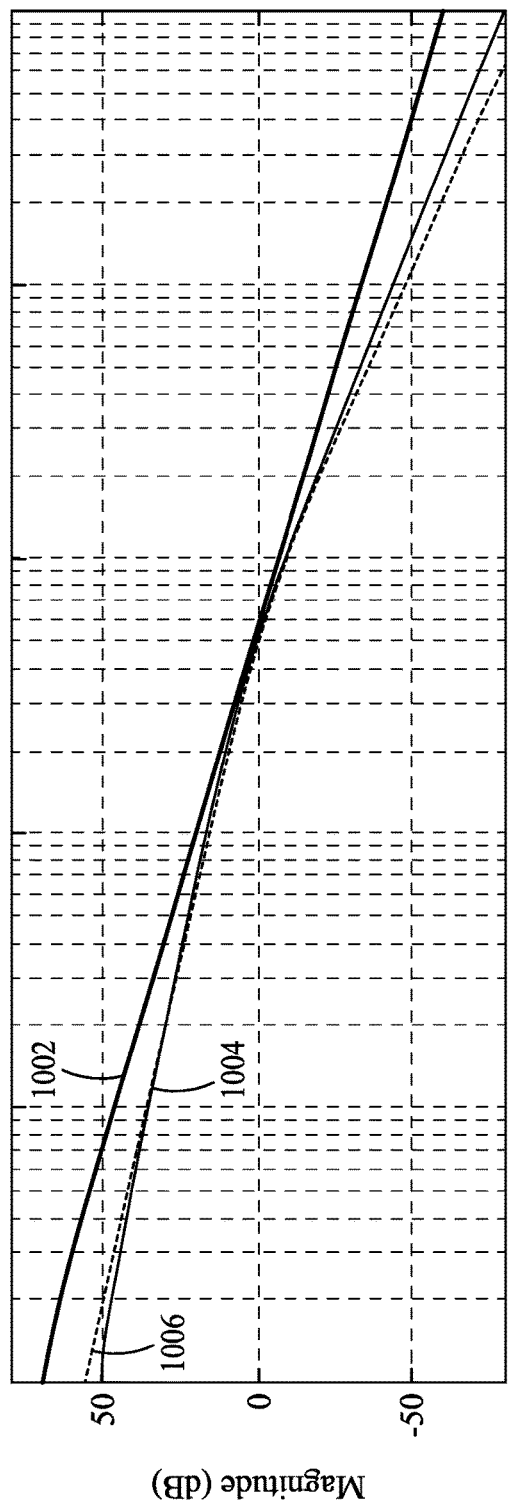
FIG. 10A is an illustration of a Bode plot indicating an open-loop magnitude response of an open loop for the FODRS process, the FLADRC process, and the fractional order LADRC process, according to exemplary aspects of the present disclosure.
Figure 10B:
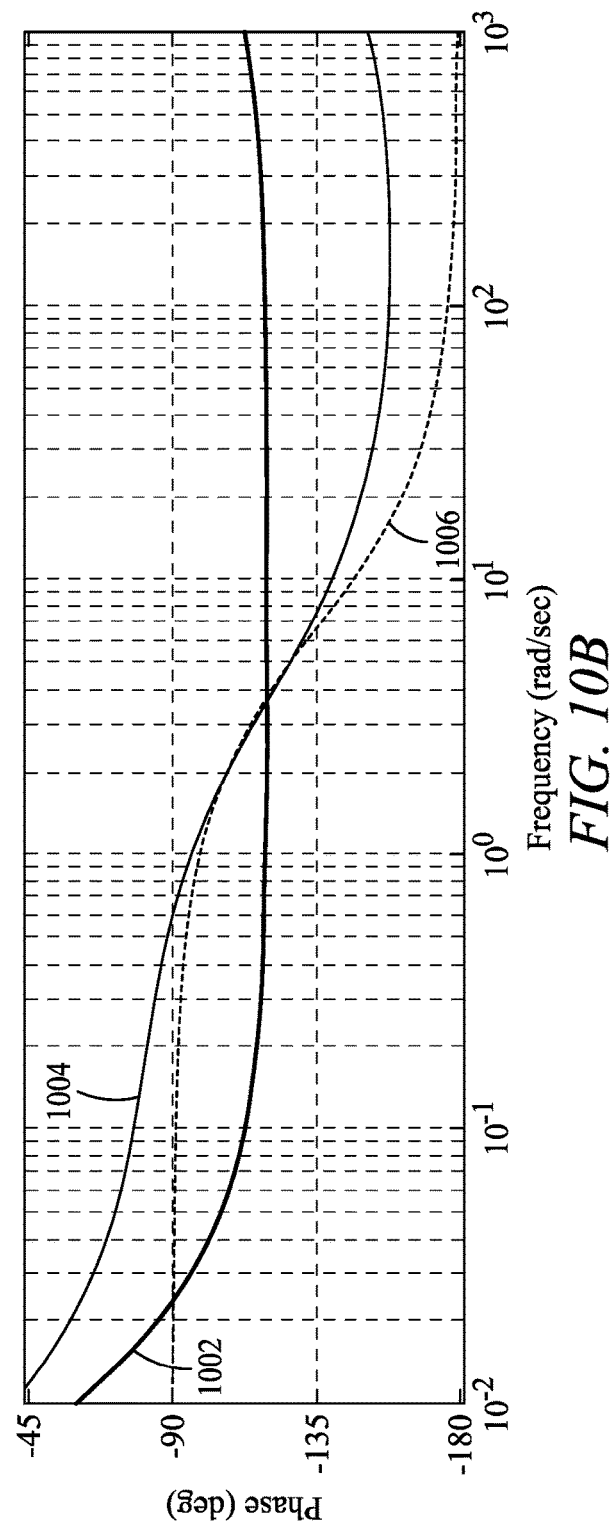
FIG. 10B is an illustration of a Bode plot indicating an open-loop phase response of an open loop for the FODRS process, the FLADRC process, and the fractional order LADRC process, according to exemplary aspects of the present disclosure.

FIG. 10A-10B show Bode plots of an open-loop response for each of the three methods, i.e., the FOLADRC (1002), FODRS (1004) and FLADRC (1006) processes, according to exemplary aspects of the present disclosure. FIG. 10A shows a Bode plot of an open-loop magnitude response for each of the three processes. FIG. 10B shows a Bode plot of an open-loop phase response for each of the three processes. The Bode plot of FIG. 10 depicts the robustness relative to the variations of the system parameters for the FOLADRC (1002) process. The open-loop response is imposed with a behavior similar to that of Bode's ITF for exhibiting the iso-damping property. The ideal shape of the open-loop transfer function as per Bode's ITF is given by:

$$G_{ol}(s) = \frac{\omega_c}{s^\mu}; \mu \in R^+ \tag{64}$$

The amplitude of curve of FIG. 10A is a straight line of constant slope of −20 μdB/dec and the phase curve of FIG. 10B is a horizontal line at μπ/2 rad. The open-loop transfer function as per Bode's ITF exhibits infinite gain margin and constant phase margin.

As shown in FIG. 10, the amplitude curve of the FOLADRC (1002) graph shows a straight line as compared to the FODRS (1004) and FLADRC (1006) graphs. Further, the phase curve of the FOLADRC (1002) graph depicts a flat horizontal line as compared to the FODRS (1004) and FLADRC (1006) processes.

Figure 11A:
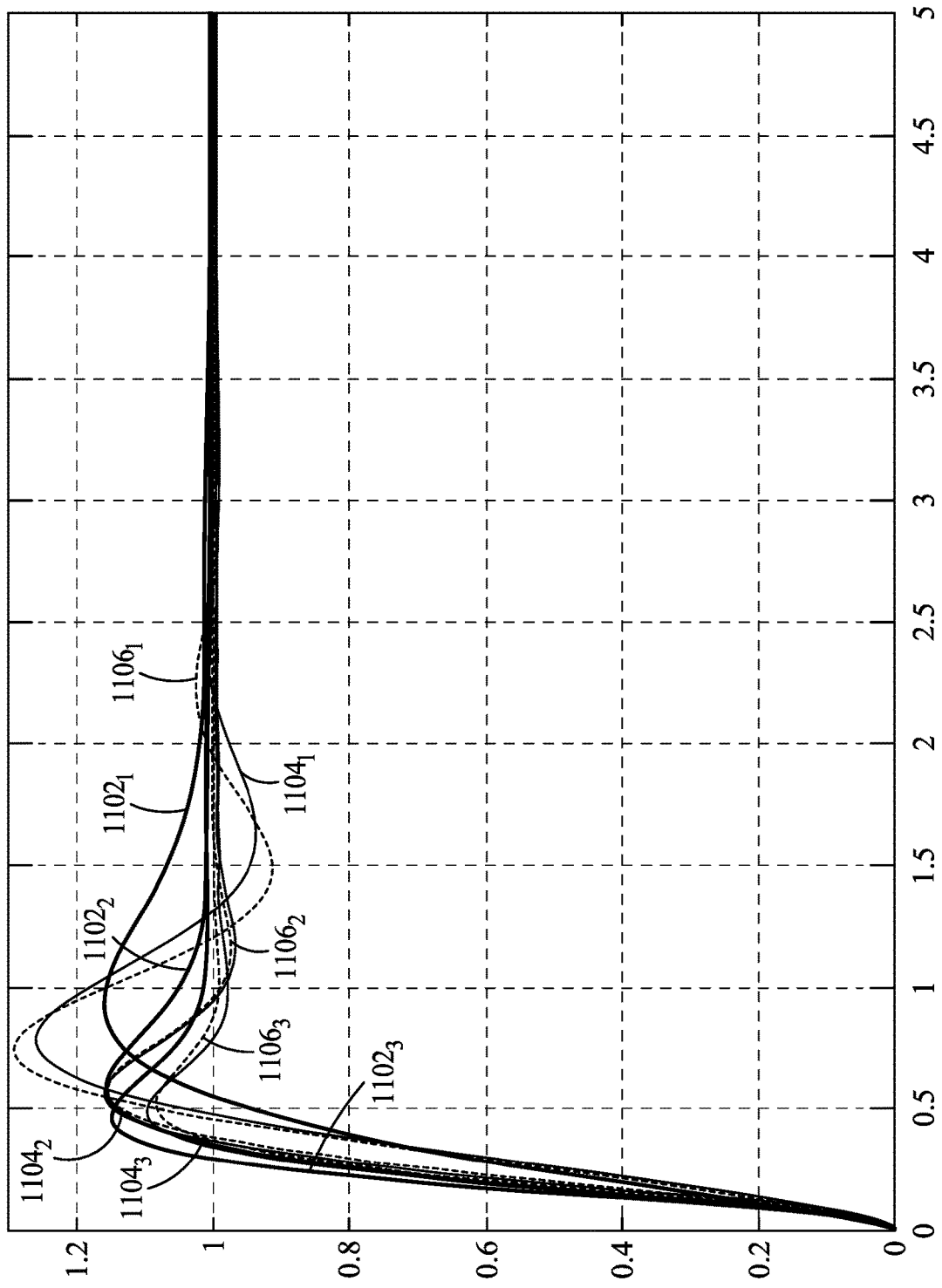
FIG. 11A is an illustration of robustness of the controllers for the FODRS process, the FLADRC process, and the fractional order LADRC process, according to exemplary aspects of the present disclosure.
Figure 11B:
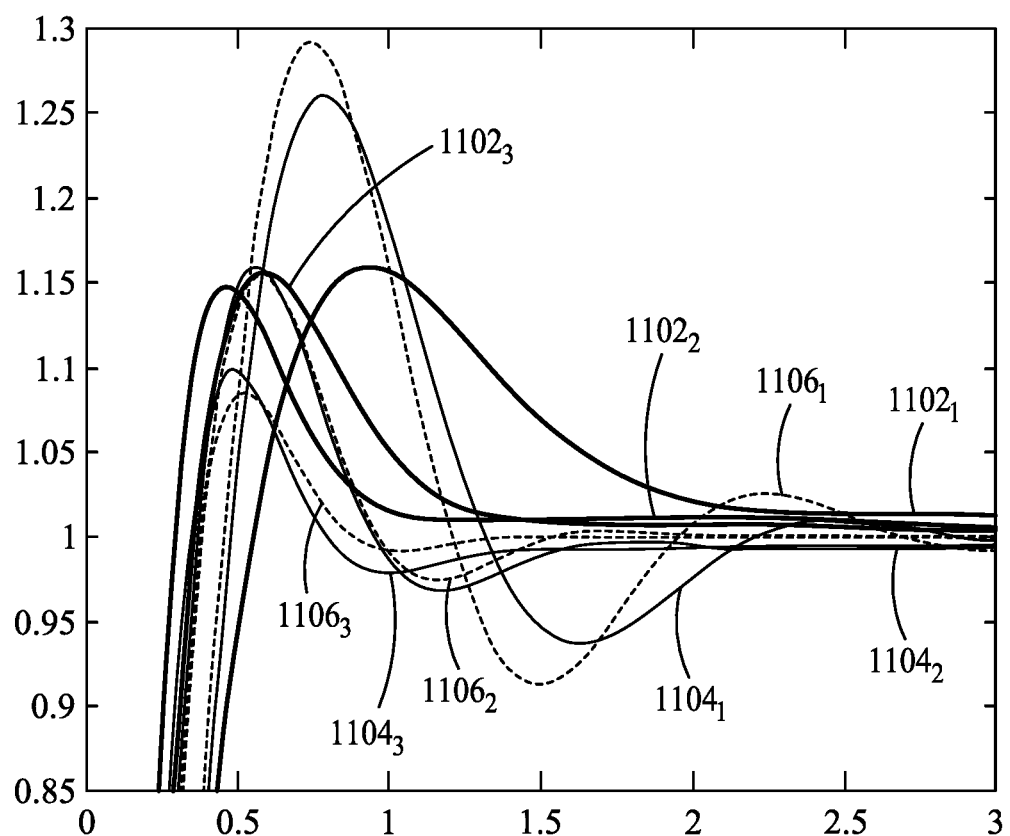
FIG. 11B is an enlarged subplot showing the robustness of the controllers for the FODRS process, the FLADRC process, and the fractional order LADRC process at t=0.5 s, according to exemplary aspects of the present disclosure.

FIG. 11A-B show a comparison of the robustness amongst the FOLADRC (1102₁, 1102₂, 1102₃), FLADRC (1106₁, 1106₂, 1106₃) and FODRS (1104₁, 1104₂, 1104₃) processes, according to exemplary aspects of the present disclosure. FIG. 11A shows a main plot illustrating comparison of the robustness amongst the FOLADRC (1102₁, 1102₂, 1102₃), FLADRC (1106₁, 1106₂, 1106₃) and FODRS (1104₁, 1104₂, 1104₃) processes. FIG. 11B shows an enlarged sub plot illustrating comparison at t=0.5 s. FIG. 11A-B relates to the data mentioned in Table (4). FIG. 11 shows the closed-loop step responses when the gain of the control signal, $u_0$ is multiplied by 0.5, 1 and 1.5 respectively. Subscript notations 1, 2 and 3 show the plot for $u_0$ which is scaled by factor of 1.5, 1 and 0.5 for the FOLADRC (1102), FODRS (1104) and FLADRC (1106) processes respectively in accordance with the values shown in Table 4. As per the figure, the overshoot in aforesaid closed-loop step response is observed to be less in the FOLADRC (1102) process as compared to the FLADRC (1106) and FODRS (1104) process.

The first embodiment is illustrated with respect to FIGS. 1-11. The first embodiment describes a fractional order linear active disturbance rejection control (FOLADRC) method. The FOLADRC method comprises receiving an input signal, r, by a plant process control circuit; multiplying the input signal, r by a first gain ($K_c$) to generate a modified signal, $u_0$; dividing the modified signal, $u_0$ by a static gain, $b_0$, to generate a process variable, u; multiplying a first disturbance, $d_u$, by the process variable, u, at an input to a plant; multiplying a second disturbance, $d_y$, by an output of the plant; generating a disturbed plant output, y; feeding back the disturbed plant output, y, and the process variable, u, to a fractional order state extended observer (FESO) controller, the FESO controller having an observer gain vector (L) and a cross over frequency bandwidth, $\omega_c$, wherein the FESO controller has circuitry and a processor having program instructions configured to estimate the first disturbance, estimate the second disturbance, generate a first disturbance cancelling feedback signal, $z_1$, and generate a second disturbance cancelling feedback signal, $z_3$; multiplying the input signal r, by the first disturbance canceling feedback signal, $z_1$; multiplying the modified signal, $u_0$, by the second disturbance cancelling feedback signal, $z_3$; and incrementally changing, by the FESO controller, the observer gain vector, L, and the FESO controller bandwidth, $\omega_c$, until a closed loop transfer function of the FESO controller converges.

The closed loop transfer function, $G_{ry}(s)$, is given by:

$$G_{ry}(s) = \frac{k_c}{s^{2\lambda} + k_c},$$

where s is a Laplace transform of the output, y, and λ is a non-integer order of the LADRC, wherein λ equals (log ω)/2.

The gain vector, L, is given by [$2\omega_o, \omega_o^2$], where $\omega_o$ is the FESO frequency bandwidth.

The first gain, $K_c$, is given by $K_c = \omega_c$.

The fractional order LADRC method further comprises setting a constraint that a phase difference between the input signal, r, and the output signal, y, is constant within a frequency range between a minimum frequency, $\omega_L$, and a maximum frequency, $\omega_H$, wherein $\omega_L \leq \omega_C \leq \omega_H$.

The fractional order LADRC method further comprises determining the non-integer order, λ, by imposing a closed loop step response which has an iso-damping property.

The fractional order LADRC method further comprises: setting a Bode ideal transfer function as a reference to the FESO; applying a control law to the Bode ideal transfer function, wherein the control law is given by: $u_o(t) = K_c(r(t) - z_1(t))$, deriving the closed loop transfer function, $G_{ry}(s)$ to be:

$$G_{ry}(s) = \frac{k_c}{s^{2\lambda} + k_c},$$

where s is a Laplace transform of the output y, and λ is a non-integer order of the LADRC, wherein λ equals (log ω)/2.

The Bode closed loop ideal transfer function, ITF, is given by:

$$G_{cl}(s) = \frac{\omega_c}{s^\mu + \omega_c},$$

where μ=2λ.

The second embodiment is illustrated with respect to FIGS. 1-11. The second embodiment describes a fractional order state extended observer (FESO) controller circuit for closed loop plant control. The FESO controller circuit for closed loop plant control, comprises an input port configured to receive an input signal, r; an output port, the output port generating an output signal, y; a first multiplier connected to the input port; a first amplifier connected to the first multiplier, the first amplifier having a first gain $K_c$, the first amplifier configured to output a modified signal, $u_o$; a second multiplier connected to the first amplifier; a second amplifier connected to the second multiplier, the second amplifier having a static gain, $b_o^{-1}$, the second amplifier configured to output a process variable, u; a third multiplier configured to receive the process variable, u, and a first disturbance, $d_u$; a plant having a plant input and a plant output, the plant input connected to the third multiplier; a fourth multiplier connected to the plant output, the fourth multiplier configured to receive a second disturbance, dy, and multiply a plant output signal by the second disturbance, dy, to generate output signal, y; a fractional order state extended observer (FESO) controller having a first FESO controller input, a second FESO controller input, a first FESO controller output and a second FESO controller output, the first FESO controller input connected to receive the process variable, u, the second FESO controller input connected to receive the plant output signal y, wherein the FESO controller has circuitry and a processor having program instructions configured to perform fractional order linear active disturbance rejection control (LADRC) to estimate the first disturbance, estimate the second disturbance, output a first disturbance cancelling feedback signal, $z_1$, output a second disturbance cancelling feedback signal, $z_3$, transmit the first disturbance cancelling feedback signal, $z_1$, to the first multiplier and transmit the second disturbance cancelling feedback signal, $z_3$, to the second multiplier; and the FESO controller having an observer gain vector (L) and a cross over frequency bandwidth, $\omega_c$, wherein the FESO controller is configured to incrementally change the observer gain vector, L, and the FESO controller bandwidth, $\omega_c$, until a closed loop transfer function of the FESO controller converges.

The FESO controller further comprises circuitry and program instructions configured to determine a Laplace transform, s, of the output signal y, and a non-integer order, λ, of the LADRC, wherein λ equals (log ω)/2; and calculate the closed loop transfer function, $G_{ry}(s)$, given by:

$$G_{ry}(s) = \frac{k_c}{s^{2\lambda} + k_c}.$$

The FESO controller further comprises circuitry and program instructions configured to determine the gain vector, L, to be $[2\omega_o \ \omega_o^2]$, where $\omega_o$ is the FESO frequency bandwidth.

The FESO controller further comprises circuitry and program instructions configured to select the first gain, $K_c$, to be equal to $\omega_c$.

The FESO controller further comprises circuitry and program instructions configured to set a constraint on the LADRC that a phase difference between the input signal, r, and the output signal, y, is constant within a frequency range between a minimum frequency and a maximum frequency, $\omega_H$, wherein $\omega_L \leq \omega_C \leq \omega_H$.

The FESO controller further comprises circuitry and program instructions configured to determine a non-integer order, λ, of the LADRC, by imposing a closed loop step response which has an iso-damping property.

The FESO controller further comprises circuitry and program instructions configured to set a Bode ideal transfer function as a reference function; apply a control law to the Bode ideal transfer function, wherein the control law is given by: $u_o(t) = K_c(r(t) - z_1(t))$, determine a Laplace transform, s, of the output, y, and a non-integer order, λ, of the LADRC, wherein λ equals (log ω)/2; and calculate the closed loop transfer function, $G_{ry}(s)$, given by:

$$G_{ry}(s) = \frac{k_c}{s^{2\lambda} + k_c}.$$

The FESO controller further comprises circuitry and program instructions configured to apply the control law to the Bode ideal transfer function given by:

$$G_{cl}(s) = \frac{\omega_c}{s^\mu + \omega_c},$$

where μ=2λ.

The third embodiment is illustrated with respect to FIGS. 1-11. The third embodiment describes a non-transitory computer readable medium having instructions stored therein that, when executed by one or more processors, cause the one or more processors to perform a fractional order linear active disturbance rejection control (FOLADRC) method. The non-transitory computer readable medium method comprising: receiving an input signal, r, by a plant process control circuit; multiplying the input signal, r by a first gain ($K_c$) to generate a modified signal, $u_0$; dividing the modified signal, $u_0$ by a static gain, $b_0$, to generate a process variable, u; multiplying a first disturbance, $d_u$, by the process variable, u, at an input to a plant; multiplying a second disturbance, $d_y$, by an output of the plant; generating a disturbed plant output, y; feeding back the disturbed plant output, y, and the process variable, u, to a fractional order state extended observer (FESO) controller, the FESO controller having an observer gain vector (L) and a cross over frequency bandwidth, $\omega_c$, wherein the FESO controller has circuitry and a processor having program instructions configured to estimate the first disturbance, estimate the second disturbance, generate a first disturbance cancelling feedback signal, $z_1$, and generate a second disturbance cancelling feedback signal, $z_3$; multiplying the input signal, r, by the first disturbance canceling feedback signal, $z_1$; multiplying the modified signal, $u_0$, by the second disturbance cancelling feedback signal, $z_3$; and incrementally changing, by the FESO controller, the observer gain vector, L, and the FESO controller bandwidth, $\omega_c$, until a closed loop transfer function of the FESO controller converges.

The non-transitory computer readable medium method further comprises determining a non-integer order, λ, of the LADRC, by imposing a closed loop step response which has an iso-damping property.

The non-transitory computer readable medium method further comprises setting a Bode ideal transfer function as a reference function; applying a control law to the Bode ideal transfer function, wherein the control law is given by: $u_o(t) = K_c(r(t) - z_1(t))$, determining a Laplace transform, s, of the output, y, and a non-integer order, λ, of the LADRC, wherein λ equals (log ω)/2; and calculating the closed loop transfer function, $G_{ry}(s)$, given by:

$$G_{ry}(s) = \frac{k_c}{s^{2\lambda} + k_c}.$$

The non-transitory computer readable medium method further comprises applying the control law to the Bode ideal transfer function given by:

$$G_{cl}(s) = \frac{\omega_c}{s^\mu + \omega_c},$$

where μ=2λ.

Figure 12:
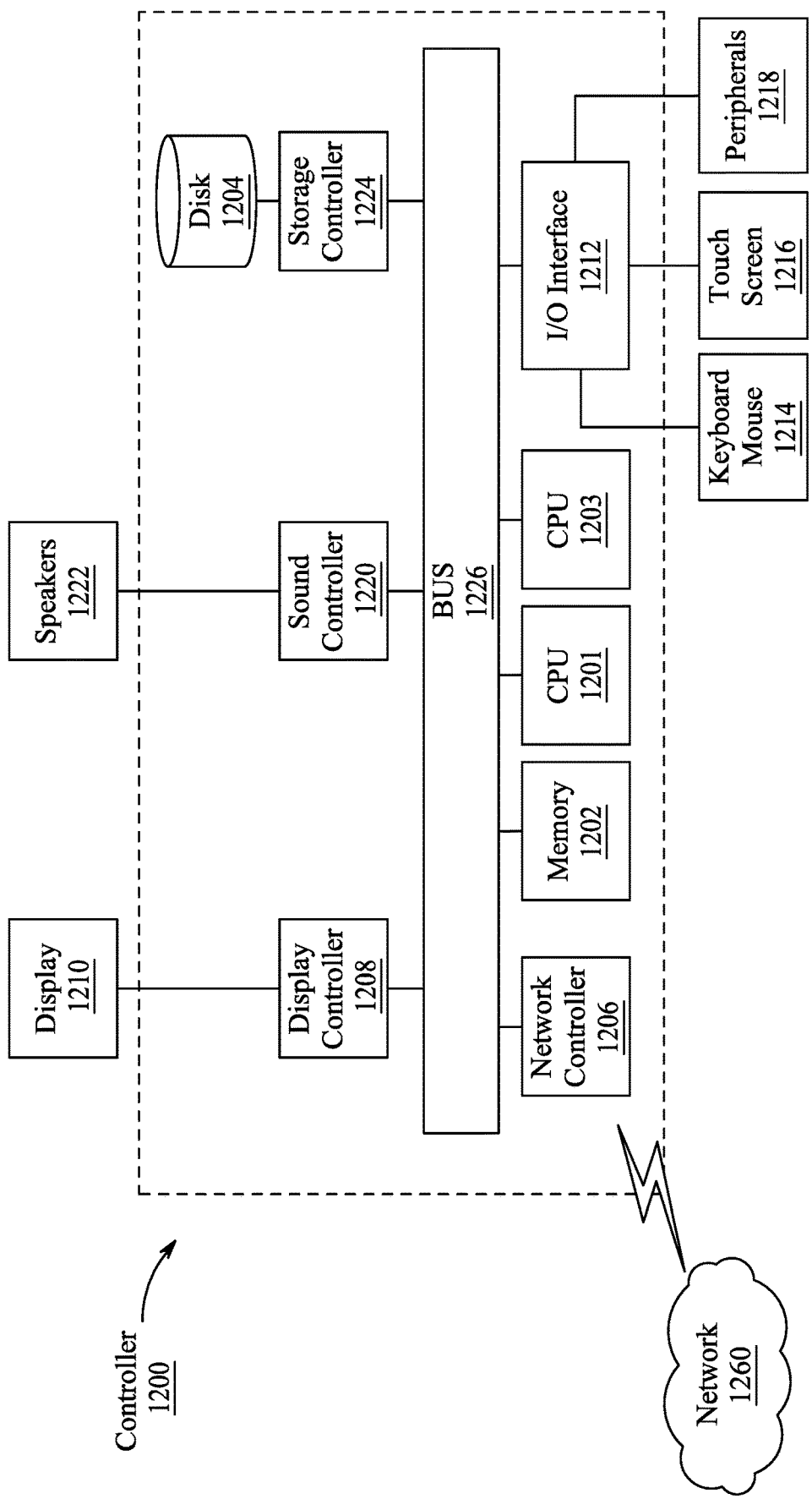
FIG. 12 is an illustration of a non-limiting example of details of computing hardware used in the computing system, according to certain embodiments.

FIG. 12 is an illustration of a non-limiting example of details of computing hardware used in the computing system, according to exemplary aspects of the present disclosure. In FIG. 12, a controller 1200 is described, which is a computing device (for example, the FESO controller 616) and includes a CPU 1201 which performs the processes described above/below. The process data and instructions may be stored in memory 1202. These processes and instructions may also be stored on a storage medium disk 1204 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1201, 1203 and an operating system such as Microsoft Windows 7, UNIX, Solaris, LINUX, Apple MAC-OS, and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general-purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
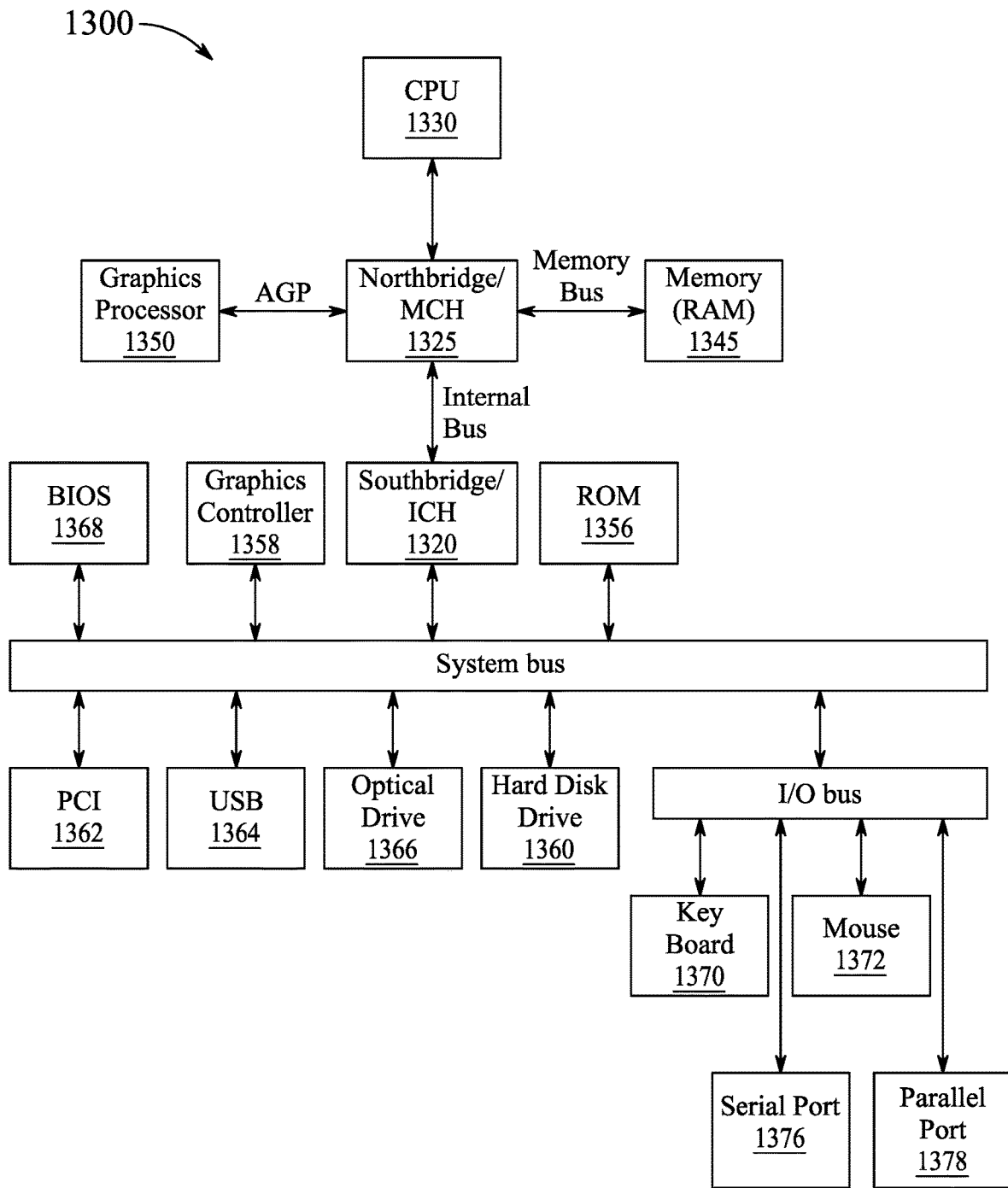
FIG. 13 is an exemplary schematic diagram of a data processing system used within the computing system, according to certain embodiments.

FIG. 13 shows a schematic diagram of a data processing system 1300 used within the computing system, according to exemplary aspects of the present disclosure. The data processing system 1300 is an example of a computer in which code or instructions implementing the processes of the illustrative aspects of the present disclosure may be located.

In FIG. 13, data processing system 1380 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1025. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
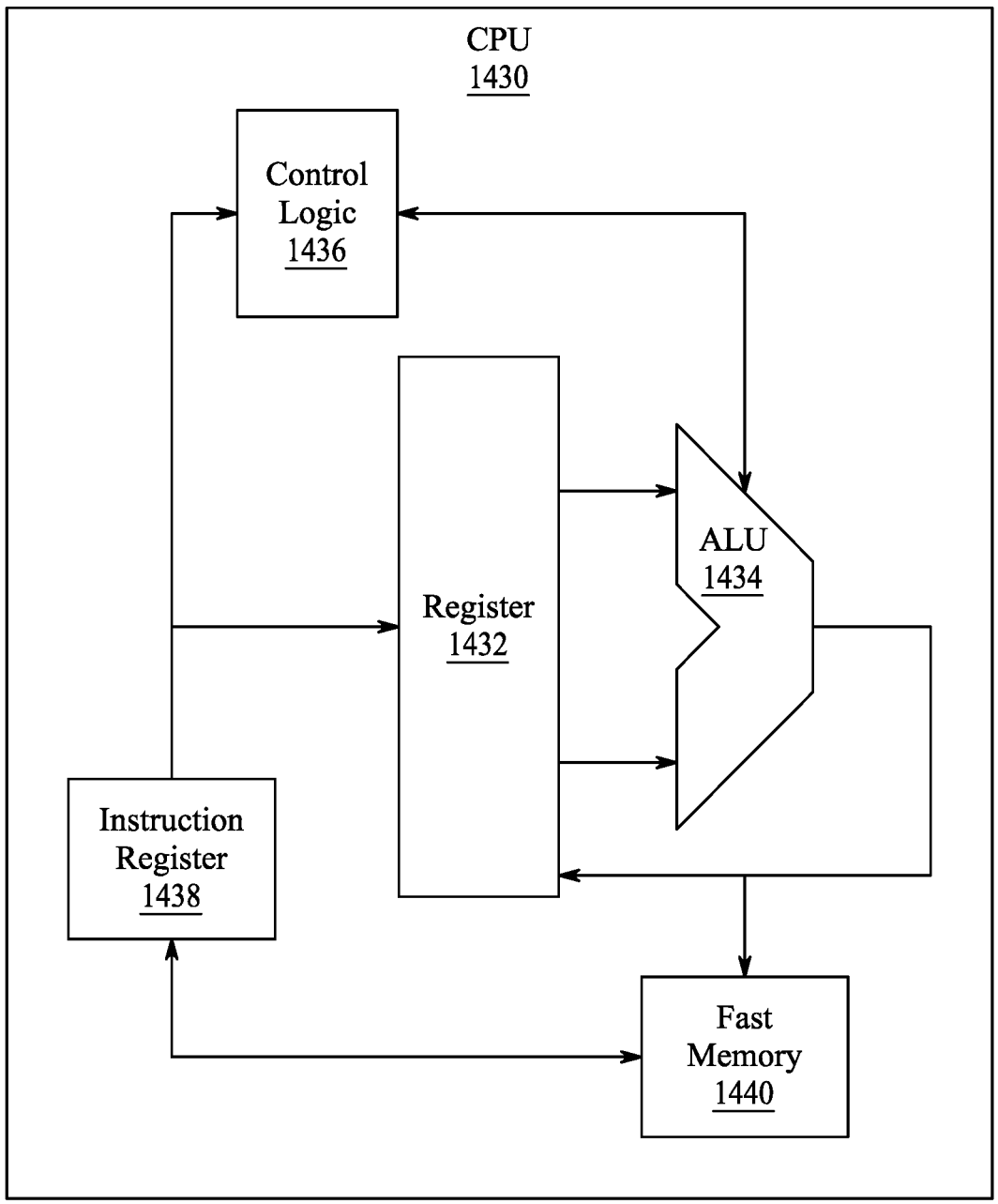
FIG. 14 is an exemplary schematic diagram of a processor used with the computing system, according to certain embodiments.
Figure 15:
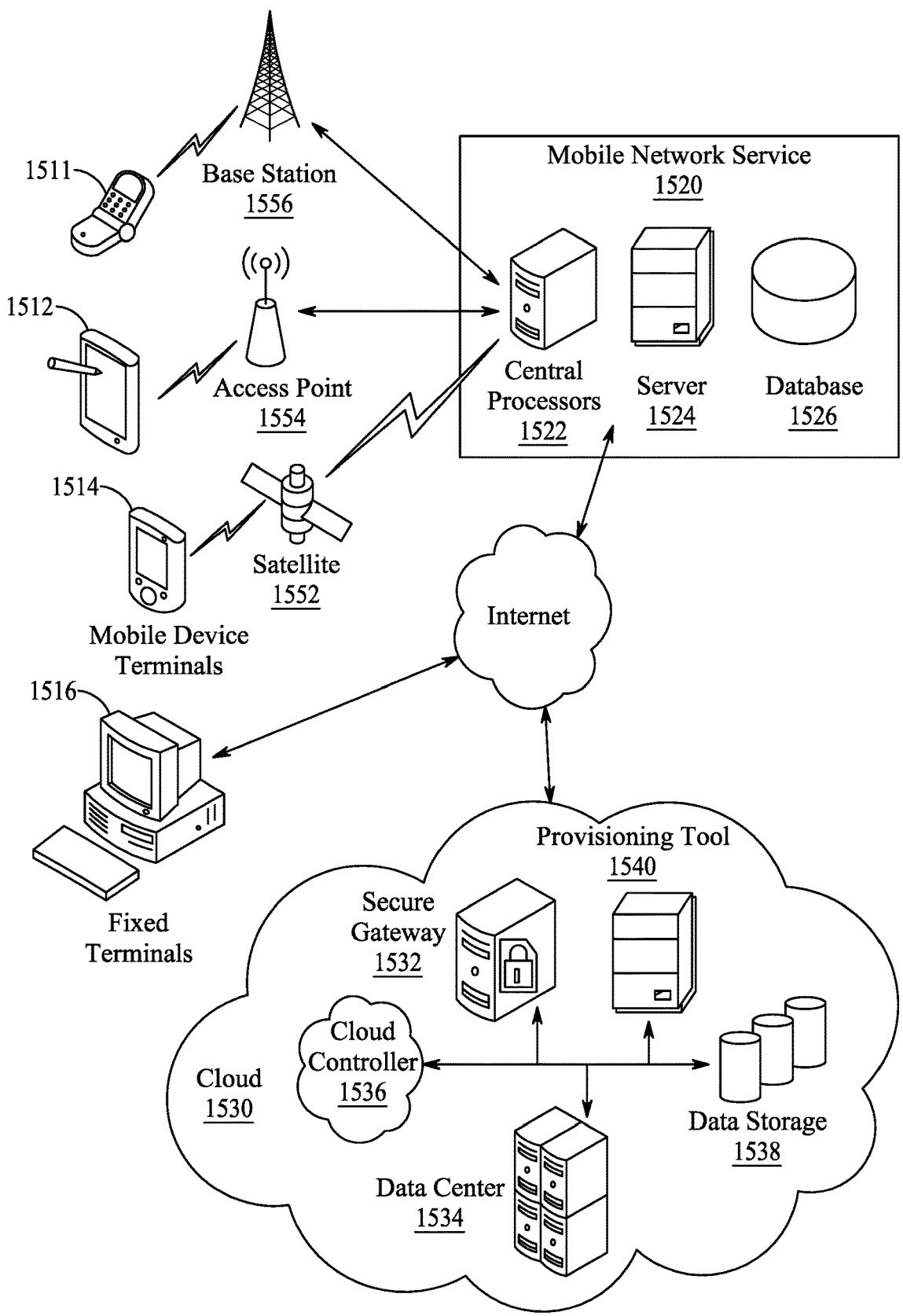
FIG. 15 is an illustration of a non-limiting example of distributed components which may share processing with the controller, according to certain embodiments.

For example, FIG. 14 shows one aspect of the present disclosure of CPU 1330. In one aspect of the present disclosure, the instruction register 1438 retrieves instructions from the fast memory 1440. At least part of these instructions is fetched from the instruction register 1438 by the control logic 1436 and interpreted according to the instruction set architecture of the CPU 1330. Part of the instructions can also be directed to the register 1432. In one aspect of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain aspects of the present disclosures, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1380 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 1320 through a PCI bus 1362.

The PCI devices may include, for example, Ethernet adapters, add-in cards, and PC cards for notebook computers. The Hard disk drive 1360 and CD-ROM 1356 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1360 and optical drive 1366 can also be coupled to the SB/ICH 1320 through a system bus. In one aspect of the present disclosure, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A fractional order linear active disturbance rejection control (LADRC) method, comprising:
   receiving an input signal, r, by a plant process control circuit;
   multiplying the input signal, r by a first gain ($K_c$) to generate a modified signal, $u_0$;
   dividing the modified signal, $u_0$ by a static gain, $b_0$, to generate a process variable, u;
   multiplying a first disturbance, $d_u$, by the process variable, u, at an input to the plant;
   multiplying a second disturbance, $d_y$, by an output of the plant;
   generating a disturbed plant output, y;
   feeding back the disturbed plant output, y, and the process variable, u, to a fractional order state extended observer (FESO) controller, the FESO controller having an observer gain vector (L) and a cross over frequency bandwidth, $\omega_c$, wherein the FESO controller has circuitry and a processor having program instructions configured to estimate the first disturbance, estimate the second disturbance, generate a first disturbance cancelling feedback signal, $z_1$, and generate a second disturbance cancelling feedback signal, $z_3$;
   multiplying the input signal r, by the first disturbance canceling feedback signal, $z_1$;
   multiplying the modified signal, $u_0$, by the second disturbance cancelling feedback signal, $z_3$; and
   incrementally changing, by the FESO controller, the observer gain vector, L, and the FESO controller bandwidth, $\omega_c$, until a closed loop transfer function of the FESO controller converges.

2. The fractional order LADRC method of claim 1, wherein the closed loop transfer function, $G_{ry}(s)$ is given by:

$$G_{ry}(s) = \frac{k_c}{s^{2\lambda} + k_c}$$

where s is a Laplace transform of the output, y, and $\lambda$ is a non-integer order of the LADRC, and $\lambda$ equals $(\log \omega)/2$.

3. The fractional order LADRC method of claim 1, wherein the gain vector, L, is given by $[2\omega_o, \omega_o^2]$, where $\omega_0$ is the FESO frequency bandwidth.

4. The fractional order LADRC method of claim 2, wherein the first gain, $K_c$, is given by $K_c = \omega_c$.

5. The fractional order LADRC method of claim 2, further comprising:
   setting a constraint that a phase difference between the input signal, r, and the output signal, y, is constant within a frequency range between a minimum frequency, and a maximum frequency, $\omega_H$, wherein $\omega_L \le \omega_C \le \omega_H$.

6. The fractional order LADRC method of claim 1, further comprising:
   determining the non-integer order, $\lambda$, by imposing a closed loop step response which has an iso-damping property.

7. The fractional order LADRC method of claim 6, further comprising:
   setting a Bode ideal transfer function as a reference to the FESO;
   applying a control law to the Bode ideal transfer function, wherein the control law is given by:

$$u_o(t) = K_c(r(t) - z_1(t)),$$

deriving the closed loop transfer function, $G_{ry}(s)$ to be:

$$G_{ry}(s) = \frac{k_c}{s^{2\lambda} + k_c},$$

where s is a Laplace transform of the output y, and $\lambda$ is a non-integer order of the LADRC, wherein $\lambda$ equals $(\log \omega)/2$.

8. The fractional order LADRC method of claim 7, wherein the Bode closed loop ideal transfer function, ITF, is given by:

$$G_{cl}(s) = \frac{\omega_c}{s^\mu + \omega_c},$$

where $\mu = 2\lambda$.

9. A fractional order state extended observer (FESO) controller circuit for closed loop plant control, comprising:

an input port configured to receive an input signal, r;
an output port, the output port generating an output signal, y;
a first multiplier connected to the input port;
a first amplifier connected to the first multiplier, the first amplifier having a first gain $K_c$, the first amplifier configured to output a modified signal, $u_o$;
a second multiplier connected to the first amplifier;
a second amplifier connected to the second multiplier, the second amplifier having a static gain, $b_o^{-1}$, the second amplifier configured to output a process variable, u;
a third multiplier configured to receive the process variable, u, and a first disturbance, $d_u$;
a plant having a plant input and a plant output, the plant input connected to the third multiplier;
a fourth multiplier connected to the plant output, the fourth multiplier configured to receive a second disturbance, $d_y$, and multiply a plant output signal by the second disturbance, $d_y$, to generate the output signal, y;
a fractional order state extended observer (FESO) controller having a first FESO controller input, a second FESO controller input, a first FESO controller output and a second FESO controller output, the first FESO controller input connected to receive the process variable, u, the second FESO controller input connected to receive the plant output signal y, wherein the FESO controller has circuitry and a processor having program instructions configured to perform fractional order linear active disturbance rejection control (LADRC) to estimate the first disturbance, estimate the second disturbance, output a first disturbance cancelling feedback signal, $z_1$, output a second disturbance cancelling feedback signal, z3, transmit the first disturbance cancelling feedback signal, z1, to the first multiplier and transmit the second disturbance cancelling feedback signal, z3, to the second multiplier; and
the FESO controller having an observer gain vector (L) and a cross over frequency bandwidth, $\omega_c$, wherein the FESO controller is configured to incrementally change the observer gain vector, L, and the FESO controller bandwidth, $\omega_c$, until a closed loop transfer function of the FESO controller converges.

10. The fractional order state extended observer (FESO) controller circuit of claim 9, the FESO controller further comprising:
circuitry and program instructions configured determine a Laplace transform, s, of the output signal y, and a non-integer order, $\lambda$, of the LADRC, wherein $\lambda$ equals (log $\omega$)/2; and
calculate the closed loop transfer function, $G_{ry}(s)$, given by:

$$G_{ry}(s) = \frac{k_c}{s^{2\lambda} + k_c}.$$

11. The fractional order state extended observer (FESO) controller circuit of claim 10, the FESO controller further comprising:
circuitry and program instructions configured to determine the gain vector, L, to be $[2\omega_o\ \omega_o^2]$, where $\omega_o$ is the FESO frequency bandwidth.

12. The fractional order state extended observer (FESO) controller circuit of claim 11, the FESO controller further comprising:

circuitry and program instructions configured to select the first gain, $K_c$, to be equal to $\omega_c$.

13. The fractional order state extended observer (FESO) controller circuit of claim 12, the FESO controller further comprising:
circuitry and program instructions configured to set a constraint on the LADRC that a phase difference between the input signal, r, and the output signal, y, is constant within a frequency range between a minimum frequency, $\omega_L$, and a maximum frequency, $\omega_H$, wherein $\omega_L \leq \omega_C \leq \omega_H$.

14. The fractional order state extended observer (FESO) controller circuit of claim 9, the FESO controller further comprising:
circuitry and program instructions configured to determine a non-integer order, $\lambda$, of the LADRC, by imposing a closed loop step response which has an iso-damping property.

15. The fractional order state extended observer (FESO) controller circuit of claim 14, the FESO controller further comprising:
circuitry and program instructions configured to
set a Bode ideal transfer function as a reference function;
apply a control law to the Bode ideal transfer function, wherein the control law is given by:

$$u_o(t) = K_c(r(t) - z_1(t)),$$

determine a Laplace transform, s, of the output, y, and a non-integer order, $\lambda$, of the LADRC, wherein $\lambda$ equals (log $\omega$)/2; and
calculate the closed loop transfer function, $G_{ry}(s)$, given by:

$$G_{ry}(s) = \frac{k_c}{s^{2\lambda} + k_c}.$$

16. The fractional order state extended observer (FESO) controller circuit of claim 15, the FESO controller further comprising:
circuitry and program instructions configured to apply the control law to the Bode ideal transfer function given by:

$$G_{cl}(s) = \frac{\omega_c}{s^\mu + \omega_c},$$

where $\mu = 2\lambda$.

17. A non-transitory computer readable medium having instructions stored therein that, when executed by one or more processors, cause the one or more processors to perform a fractional order linear active disturbance rejection control (LADRC) method, comprising:
receiving an input signal, r, by a plant process control circuit;
multiplying the input signal, r by a first gain ($K_c$) to generate a modified signal, $u_0$;
dividing the modified signal, $u_0$ by a static gain, $b_0$, to generate a process variable, u;
multiplying a first disturbance, $d_u$, by the process variable, u, at an input to a plant;
multiplying a second disturbance, $d_y$, by an output of the plant;
generating a disturbed plant output, y;

feeding back the disturbed plant output, y, and the process variable, u, to a fractional order state extended observer (FESO) controller, the FESO controller having an observer gain vector (L) and a cross over frequency bandwidth, ωc, wherein the FESO controller has circuitry and a processor having program instructions configured to estimate the first disturbance, estimate the second disturbance, generate a first disturbance cancelling feedback signal, $z_1$, and generate a second disturbance cancelling feedback signal, $z_3$;

multiplying the input signal, r, by the first disturbance canceling feedback signal, $z_1$;

multiplying the modified signal, u0, by the second disturbance cancelling feedback signal, $z_3$; and incrementally changing, by the FESO controller, the observer gain vector, L, and the FESO controller bandwidth, $\omega_c$, until a closed loop transfer function of the FESO controller converges.

18. The non-transitory computer readable medium method of claim 17, further comprising:

determining a non-integer order, λ, of the LADRC, by imposing a closed loop step response which has an iso-damping property.

19. The non-transitory computer readable medium method of claim 18, further comprising:

setting a Bode ideal transfer function as a reference function;

applying a control law to the Bode ideal transfer function, wherein the control law is given by:

$$u_o(t) = K_c(r(t) - z_1(t)),$$

determining a Laplace transform, s, of the output, y, and a non-integer order, λ, of the LADRC, wherein λ equals (log ω)/2; and calculating the closed loop transfer function, $G_{ry}(s)$, given by:

$$G_{ry}(s) = \frac{k_c}{s^{2\lambda} + k_c}.$$

20. The non-transitory computer readable medium method of claim 19, further comprising:

applying the control law to the Bode ideal transfer function given by:

$$G_{cl}(s) = \frac{\omega_c}{s^\mu + \omega_c},$$

where μ=2λ.

* * * * *